(12) United States Patent
Nakamura

(10) Patent No.: US 9,516,189 B2
(45) Date of Patent: Dec. 6, 2016

(54) IMAGE PROCESSING APPARATUS, SYSTEM, AND NON-TRANSITORY COMPUTER READABLE MEDIUM FOR GENERATING CODE IMAGE EXPRESSING ACQUIRED ATTRIBUTE INFORMATION

(71) Applicant: FUJI XEROX CO., LTD., Minato-ku, Tokyo (JP)

(72) Inventor: Shinya Nakamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/538,057

(22) Filed: Nov. 11, 2014

(65) Prior Publication Data

US 2015/0365559 A1   Dec. 17, 2015

(30) Foreign Application Priority Data

Jun. 11, 2014 (JP) ................................. 2014-120882

(51) Int. Cl.
   *H04N 1/00*   (2006.01)
   *H04N 1/32*   (2006.01)
   (Continued)

(52) U.S. Cl.
   CPC .......... *H04N 1/32133* (2013.01); *G06F 3/125* (2013.01); *G06F 3/1208* (2013.01);
   (Continued)

(58) Field of Classification Search
   None
   See application file for complete search history.

(56) References Cited

U.S. PATENT DOCUMENTS 4,789,147 A * 12/1988 Berger .................... B42C 19/00
                                                270/1.03
5,729,329 A *  3/1998 Ajimu .................. G03B 27/462
                                                   355/40
(Continued)

FOREIGN PATENT DOCUMENTS

JP     9-274630 A    10/1997
JP    10153958 A     6/1998
(Continued)

OTHER PUBLICATIONS

English Machine Translation of JP10-153958A (Jun. 9, 1998).*
(Continued)

*Primary Examiner* — Scott A Rogers
(74) *Attorney, Agent, or Firm* — Sughrue Mion, PLLC

(57) ABSTRACT

Provided is an image processing apparatus including an acquisition section that acquires one or more sets of attribute information which indicates an attribute of a publication, identification information which identifies the publication, and label information which indicates at least one of an arrangement of the publication in an establishment and a period during which the publication is not permitted to be lent, a conversion section that converts the acquired identification information into a code image, a generation section that generates a label image based on the acquired label information, and an image forming section that forms an image which expresses some or all of the acquired attribute information, the code image which is acquired through conversion, and the generated label image on one or more media such that image groups corresponding to one set are formed on one piece of medium.

21 Claims, 27 Drawing Sheets

(51) Int. Cl.
*G06K 15/02* (2006.01)
*G06K 9/18* (2006.01)
*G06F 3/12* (2006.01)
*G06K 19/18* (2006.01)
*G06K 19/06* (2006.01)

(52) U.S. Cl.
CPC ......... *G06F 3/1243* (2013.01); *G06K 9/183* (2013.01); *G06K 15/1822* (2013.01); *G06K 15/1825* (2013.01); *G06K 15/1852* (2013.01); *H04N 1/32352* (2013.01); *G06K 19/06028* (2013.01); *H04N 2201/3269* (2013.01); *H04N 2201/3271* (2013.01)

(56) References Cited

U.S. PATENT DOCUMENTS

| | | | | |
|---|---|---|---|---|
| 7,357,719 | B2* | 4/2008 | Yamato | A63F 13/10 463/29 |
| 8,234,693 | B2* | 7/2012 | Stahl | G06F 21/604 707/783 |
| 8,947,725 | B2* | 2/2015 | Kirita | B41J 3/01 235/462.01 |
| 2008/0037059 | A1 | 2/2008 | Inoue | |
| 2011/0102853 | A1* | 5/2011 | Makishima | H04N 1/00864 358/3.28 |

FOREIGN PATENT DOCUMENTS

| | | | |
|---|---|---|---|
| JP | 2002-163269 A | | 6/2002 |
| JP | 2003-85184 A | | 3/2003 |
| JP | 2004-234076 A | | 8/2004 |
| JP | 2007-67721 A | | 3/2007 |
| JP | 2007-79819 A | | 3/2007 |
| JP | 2008-40933 A | | 2/2008 |
| JP | 2008217124 A | * | 9/2008 |
| JP | 2013054461 A | | 3/2013 |
| JP | 2013126004 A | | 6/2013 |

OTHER PUBLICATIONS

Communication dated Nov. 24, 2015, issued by the Japan Patent Office in corresponding Japanese Application No. 2014-120882.
Communication dated Nov. 24, 2015, issued by the Japan Patent Office in corresponding Japanese Application No. 2015-157397.
Communication dated Apr. 26, 2016, issued by the Japan Patent Office in corresponding Japanese Application No. 2014-120882.

* cited by examiner

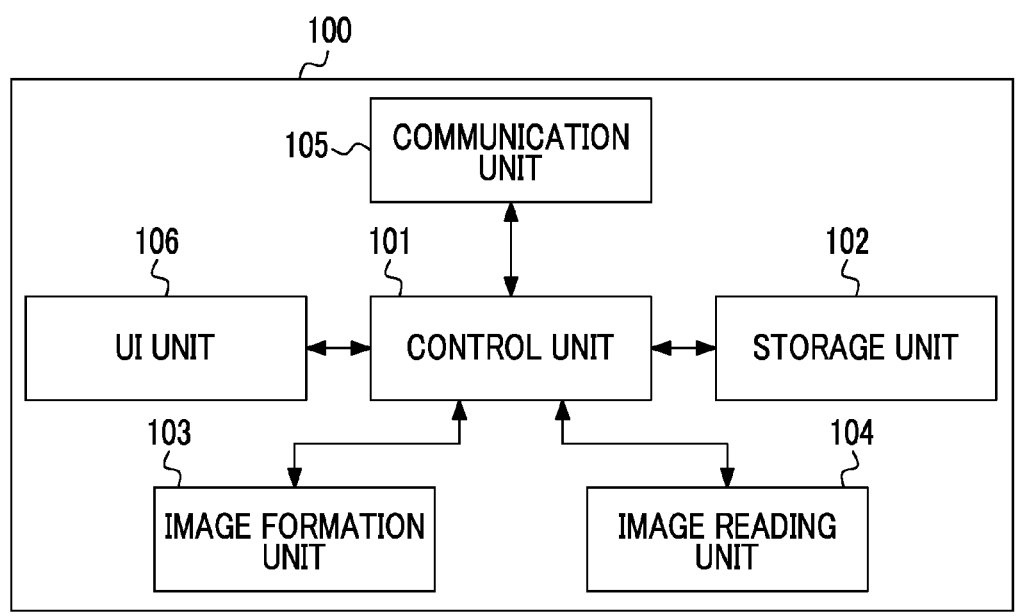
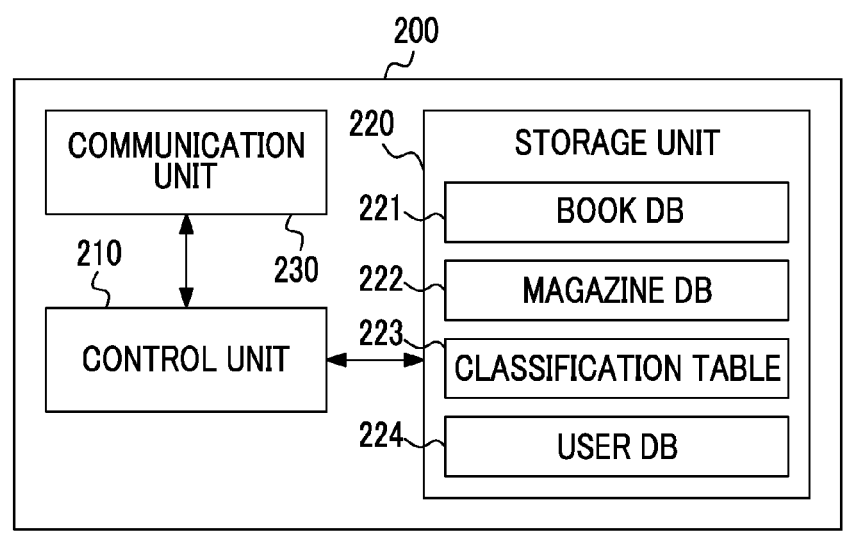

| MANAGEMENT NUMBER | TITLE | ISBN | BOOK CLASSIFICATION CODE | CALL MARK (1) | CALL MARK (3) | LENDING FLAG | LENDING DATE | USER ID |
|---|---|---|---|---|---|---|---|---|
| | | | | | | | | |
| | | | | | | | | |
| | | | | | | | | |
| | | | | | | | | |
| | | | | | | | | |

222

| MANAGEMENT NUMBER | TITLE | ISSN | SERIES | IN-LIBRARY USE ONLY PERIOD | LENDING FLAG | LENDING DATE | USER ID |
|---|---|---|---|---|---|---|---|
| | | | | | | | |
| | | | | | | | |
| | | | | | | | |
| | | | | | | | |
| | | | | | | | |

223

| BOOK CLASSIFICATION | CALL MARK (1) |
|---|---|
| | |
| | |
| | |
| | |
| | |

FIG. 30
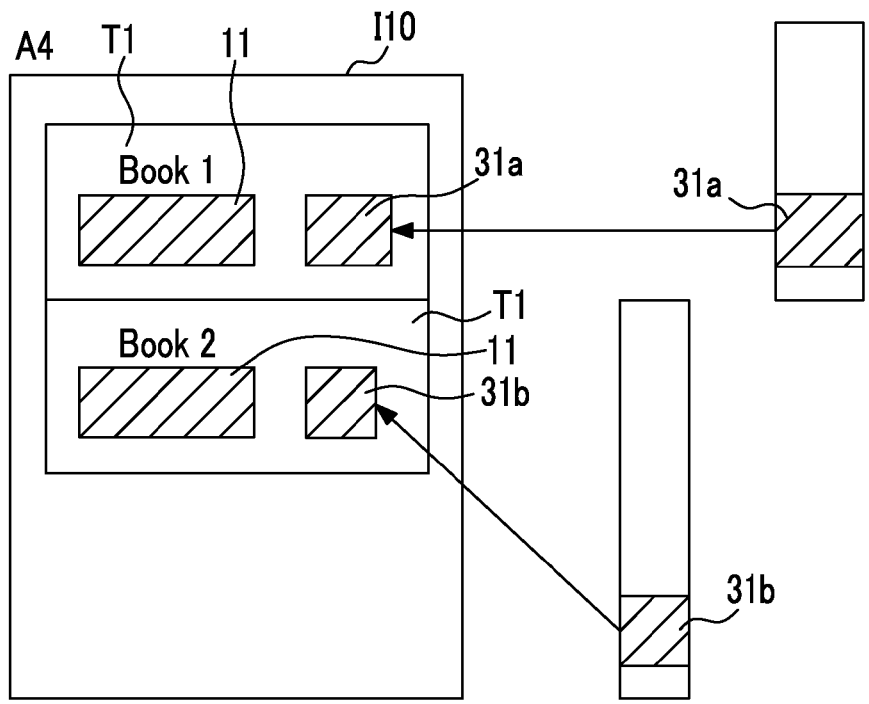
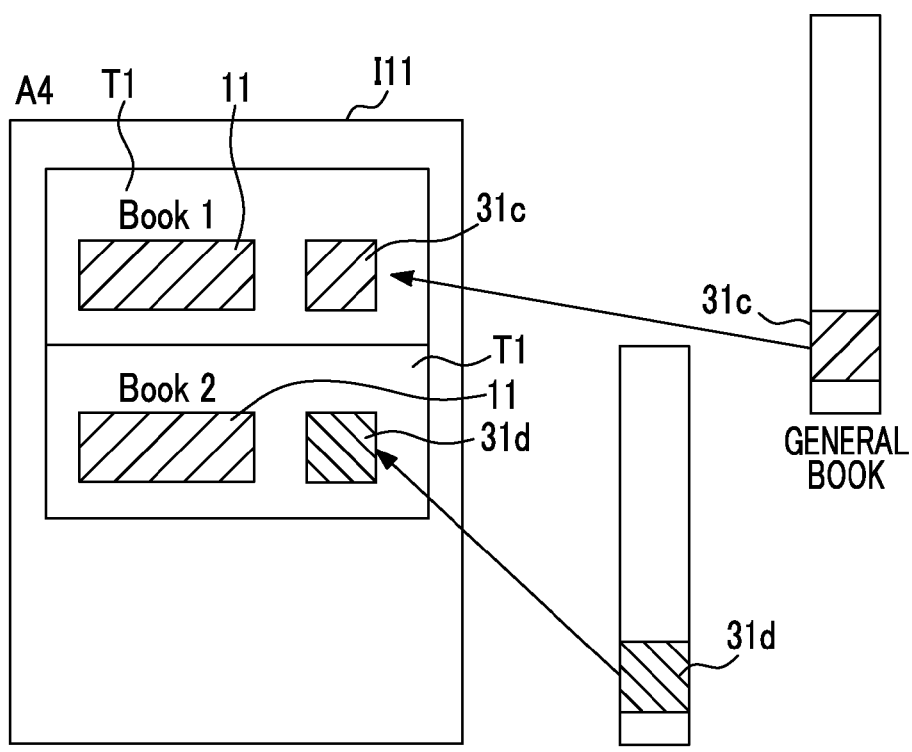

IMAGE PROCESSING APPARATUS, SYSTEM, AND NON-TRANSITORY COMPUTER READABLE MEDIUM FOR GENERATING CODE IMAGE EXPRESSING ACQUIRED ATTRIBUTE INFORMATION

CROSS-REFERENCE TO RELATED APPLICATIONS

This application is based on and claims priority under 35 USC 119 from Japanese Patent Application No. 2014-120882 filed Jun. 11, 2014.

BACKGROUND (i) Technical Field

The present invention relates to an image processing apparatus, a system, and a non-transitory computer readable medium.

(ii) Related Art

A structure in which publications, such as books and magazines, are managed using a computer has been known.

SUMMARY

According to an aspect of the invention, there is provided an image processing apparatus including:

an acquisition section that acquires one or more sets of attribute information which indicates an attribute of a publication, identification information which identifies the publication, and label information which indicates at least one of an arrangement of the publication in an establishment and a period during which the publication is not permitted to be lent;

a conversion section that converts the acquired identification information into a code image;

a generation section that generates a label image based on the acquired label information; and an image forming section that forms an image which expresses some or all of the acquired attribute information, the code image which is acquired through conversion, and the generated label image on one or more media such that image groups corresponding to one set are formed on one piece of medium.

BRIEF DESCRIPTION OF THE DRAWINGS

Exemplary embodiments of the present invention will be described in detail based on the following figures, wherein:

FIG. 2 is a block diagram illustrating the configuration of an image processing apparatus according to the exemplary embodiment;

FIG. 3 is a block diagram illustrating the configuration of a server apparatus according to the exemplary embodiment;

FIG. 4 is a diagram illustrating an example of data stored in the server apparatus;

FIG. 30 is a diagram illustrating an example of an image which is formed on the medium by the image processing apparatus.

DETAILED DESCRIPTION

Configuration

Figure 1:
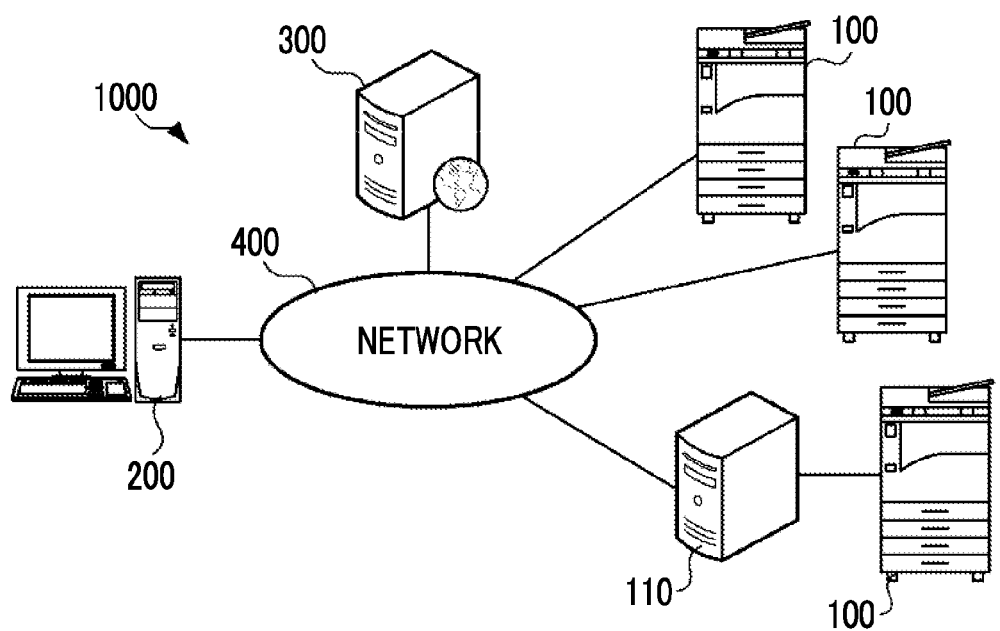
FIG. 1 is a block diagram illustrating the configuration of an information processing system according to an exemplary embodiment of the present invention.

FIG. 1 is a block diagram illustrating the configuration of an information processing system 1000 according to an exemplary embodiment of the present invention. The information processing system 1000 is a system for managing a publication. The publication is generally classified into a book and a magazine. Although the book is a publication which has a publication state completed with one volume written by one person or plural authors or editors, the book may include a survey or a complete collection published in series. In contrast, the magazine is a publication which is periodically and continuously published with the same title and to which a volume (series), a volume number, a part, a copy number, and the like are assigned. An ISBN (for example, 10 digits or 13 digits) is assigned to the book and an international standard serial number, called ISSN (for example, 8 digits or 13 digits), is attached to the magazine.

The information processing system 1000 includes an image processing apparatus 100 which is installed in, for example, a library, a server apparatus 200 which is managed by, for example, a manager of the library, a bibliography information storage apparatus 300 which is managed by, for example, a manager of the National Diet Library or a bibliography information provision site, and a network 400 which connects the apparatuses 100 to 300. The image processing apparatus 100 is so-called a multi-function machine which has an image reading function and an image forming function. The server apparatus 200 interprets an image which is read by the image processing apparatus 100, acquires bibliography information from the bibliography information storage apparatus 300, and executes a process relative to the management of the publication. The process relative to the management of the publication includes at least any one of a process to register or remove the publication in or from a database in the server apparatus 200, a process to update the database in order to lend the publication, and a process to update the database in order to return the lent publication. The bibliography information storage apparatus 300 is a Web server apparatus which stores the bibliography information of a huge number of publications and provides the bibliography information through the network 400. The network 400 includes various kinds of networks such as a Local Area Network (LAN), an Intranet, a Virtual Private Network (VPN), and the Internet. The number of each of the image processing apparatus 100, the server apparatus 200, and the bibliography information storage apparatus 300 is not limited to the example shown in FIG. 1. Meanwhile, the function of the server apparatus 200 may be implemented by any one of the image processing apparatuses 100 or may be implemented by an information processing apparatus 110 which is connected to any one of the image processing apparatuses 100 as a front-end device. In addition, the function of the server apparatus 200 may be distributed to plural server apparatuses, and each of the server apparatuses may share and execute the same function as that of the server apparatus 200. The function of the server apparatus 200 may be provided as a so-called cloud service. In addition, the configurations (the image processing apparatus 100, the server apparatus 200, and the information processing apparatus 110) other than the bibliography information storage apparatus 300 may be mounted in a single apparatus.

FIG. 2 is a block diagram illustrating the configuration of the image processing apparatus 100. The image processing apparatus 100 is an information processing apparatus which includes a control unit 101, a storage unit 102, an image formation unit 103, an image reading unit 104, a communication unit 105, and a User Interface (UI) unit 106. The control unit 101 is a section which controls each of the units of the image processing apparatus 100 and includes, for example, a control circuit, such as an Application Specific Integrated Circuit (ASIC) or a Central Processing Unit (CPU), and various types of memory. The storage unit 102 is, for example, a storage section such as a hard disk, and stores a program which is executed by the CPU or data which is used in association with the execution of the program. The image formation unit 103 is, for example, a section which forms an image on a medium in an electrographic manner, forms a latent image by irradiating an image holding body, such as a photoreceptor, with laser beams, transfers the latent image on the medium, such as a record sheet, by developing the latent image using toners having respective colors, such as Yellow (Y), Magenta (M), Cyan (C), and black (K), and discharges the medium through a fixing process. The image reading unit 104 is a section which generates image data by optically reading an image on a manuscript. The communication unit 105 is a section which transmits and receives data, and performs communication with the server apparatus 200 through the network 400. The UI unit 106 is a section which realizes conversation with a user, and includes, for example, an operation unit which includes operators, such as keys and touch sensors, and which supplies an operation signal according to the operation of the user to the control unit 101, and a display unit which includes, for example, a liquid crystal panel or a liquid crystal driving circuit and which displays an image under the control of the control unit 101.

FIG. 3 is a block diagram illustrating the configuration of the hardware of the server apparatus 200. The server apparatus 200 includes a control unit 210, a storage unit 220, and a communication unit 230. The control unit 210 is a section which controls the operation of each of the units of the server apparatus 200. The control unit 210 includes a control circuit, such as the CPU, and various types of memories, and controls the operation of each of the units of the server apparatus 200 by executing the program. The storage unit 220 is a section which stores data to be used in the server apparatus 200. The storage unit 220 is, for example, a hard disk, and stores data which is used in association with the program which is executed by the control unit 210 or data which is used in association with the execution of the program. Here, the storage unit 220 stores a book Data Base (DB) 221, a magazine DB 222, a classification table 223, and a user DB 224. The communication unit 230 is a section which transmits and receives data, and performs communication with the image processing apparatus 100 and the bibliography information storage apparatus 300 through the network 400.

FIG. 4 is a diagram illustrating some parts of the content of the book DB 221, the magazine DB 222, and the classification table 223. In the book DB 221, a management number is identification information for identifying books, which belong to a library, one by one. A title is the title of the book. When there are plural books which have the same title, different management numbers are respectively assigned thereto. An ISBN is an international standard book number which is assigned to the book. A book classification code is standard classification based on the subject or the content of the book, and Nippon Decimal Classification (NDC9) has been known in Japan. A call mark (1) is book classification which is used in each library. The Nippon Decimal Classification or classification, which is uniquely determined by a library, is used as the call mark (1). Generally, in a library, the shelving location of each book and an alignment sequence on a bookshelf are determined based on the book classification. Therefore, the shelving location of each book and the alignment sequence on the bookshelf are specified using the call mark (1) in the library. A call mark (3) is classification, such as the volume number or the year of publication of each book, of a survey and a complete collection published in series. The call mark (3) is a serial number within the call mark (1), and the same number is generally used as a serial number in a case of the same title. A lending flag is a flag which indicates whether or not a book is being lent. A lending date is a date at which a book is lent when the book is being lent. A user ID is identification information of a user who borrowed a book when the book is being lent.

Each piece of data included in the magazine DB 222 may be understood by replacing "book" of the above-described book DB 221 with "magazine". Meanwhile, the magazine DB includes an in-library use only period during which lending is forbidden from the date of publication of the magazine.

The classification table 223 indicates the correspondence relation between the book classification code which is standard book classification and call mark (1) which is the library's book classification. With the classification table, it is possible to convert the standard book classification code, such as the NDC9, into the call mark (1) which is used in the library. The user DB 224 is a database which includes a user ID allocated to the user or the attribute of the user.

Figure 5:
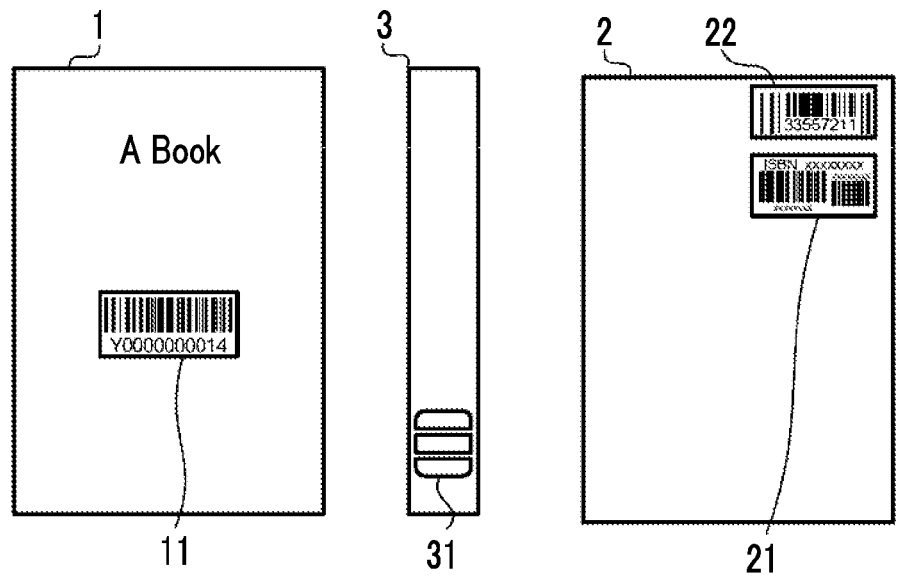
FIG. 5 is a diagram illustrating the appearance of a book.

FIG. 5 is a plan view illustrating an example of the appearance of a publication. In the example of FIG. 5, a management bar code 11 which indicates the management number is attached to a cover 1 of the publication. The management bar code 11 is identification information, which is capable of identifying the publication one by one, as described above. Further, the management number is, for example, "YB000123" in a case of a book, and the management number is, for example, "YM0000123" in a case of a magazine. That is, a book and a magazine may be allowed to be identified based on the management number using an identifier "YB", which means a book, and an identifier "YM", which means a magazine, as a part of the management number. In addition, although the management bar code 11 is attached to the cover 1 in the example, the management bar code 11 may be attached to a back cover 2 or a spine cover 3.

An ISBN bar code 21 which means an ISBN assigned to the publication (in a case of a book), an ISSN bar code 21 which means an ISSN (in a case of a magazine), and a price bar code 22 which indicates the price of the publication are printed on or attached to the back cover 2 of the publication. A label 31 is attached to the spine cover 3. The label is displayed with three-stage configuration, the call mark (1) is written in the uppermost stage, and the call mark (3) is written in the lowermost stage.

Figure 6:
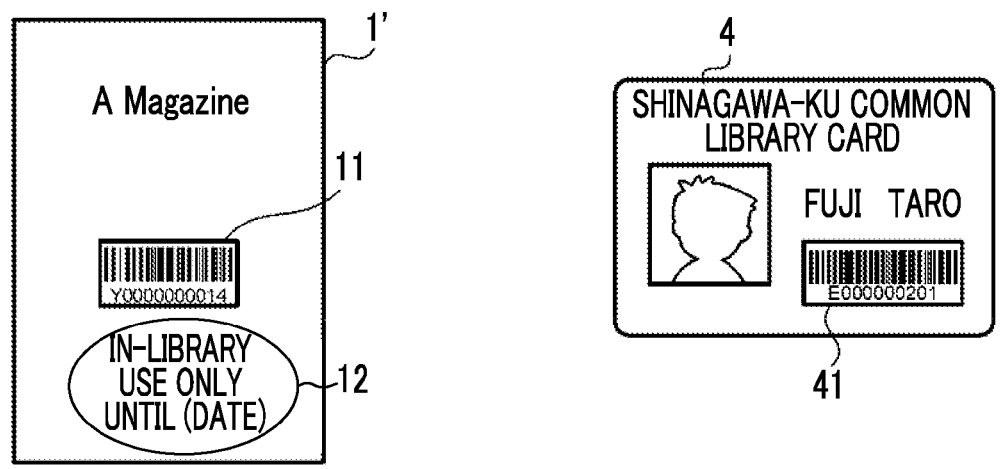
FIG. 6 is a diagram illustrating the appearances of a magazine and a user card.

In the case of the magazine, an in-library use only label 12, which means the in-library use only period, is attached to the cover 1 or the like of the magazine (refer to FIG. 6). When the publication is lent, lending is performed for only a user who possesses a user card 4 shown in FIG. 6. A user ID bar code 41, which indicates a user ID for identifying each user, is printed on or attached to the user card 4.

Meanwhile, a format, which is used when the various pieces of information are expressed, is not necessarily a bar code, and a code acquired by encoding each of the pieces of information may be used.

Figure 7:
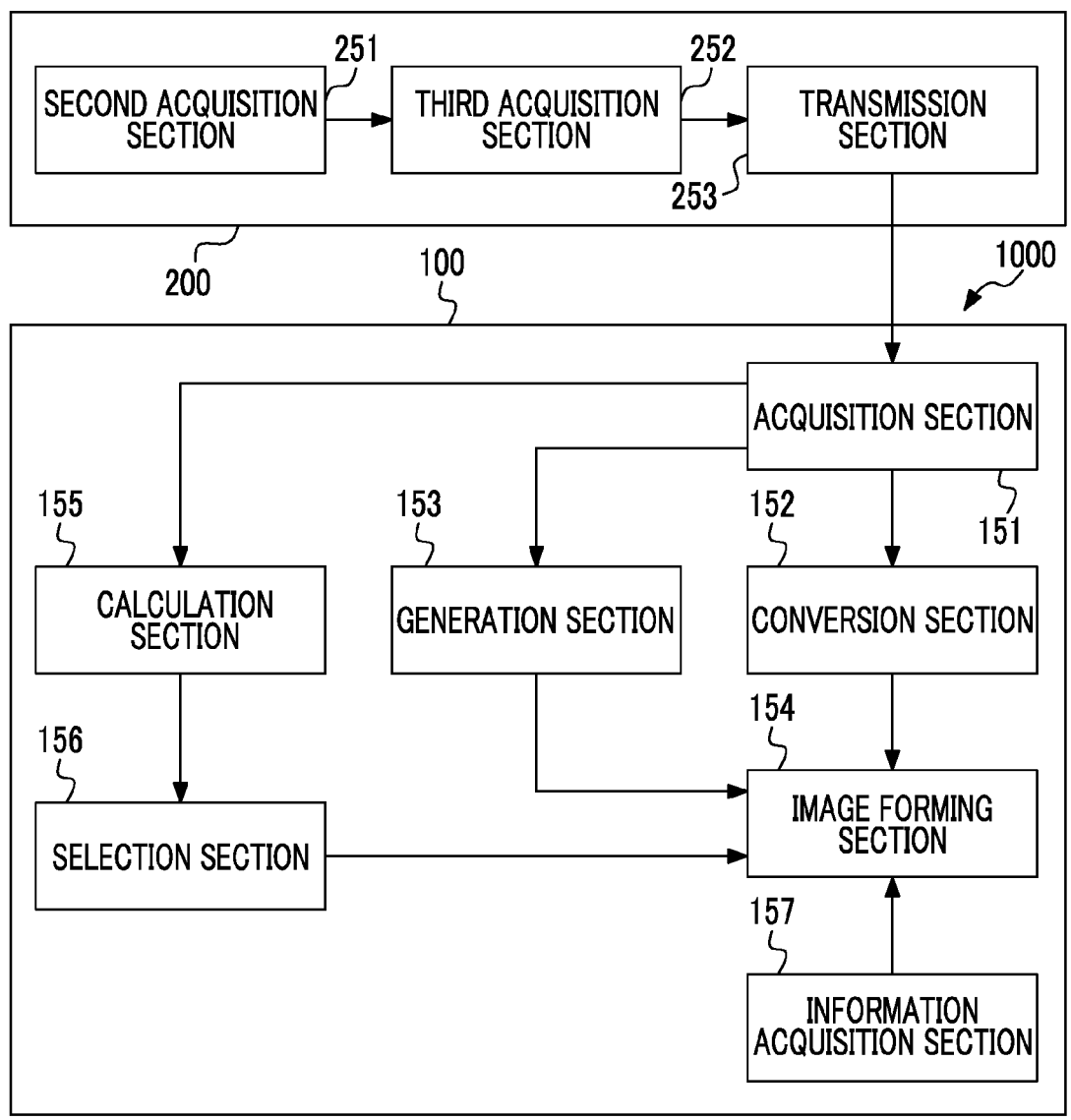
FIG. 7 is a diagram illustrating the functional configuration of the server apparatus.

FIG. 7 is a diagram illustrating the functional configuration of the system 1000. The image processing apparatus 100 includes an acquisition section 151, a conversion section 152, a generation section 153, an image forming section 154, a calculation section 155, a selection section 156, and an information acquisition section 157. The acquisition section 151 acquires one or more sets of attribute information which indicates the attribute of the publication, identification information which is used to identify the publication, and label information which indicates at least one of the arrangements of the publication on installation and a period during which the lending of the publication is not permitted. The conversion section 152 converts the identification information, which is acquired by the acquisition section 151, into a code image. The generation section 153 generates a label image based on the label information which is acquired by the acquisition section 151. The image forming section 154 forms an image, which expresses some or all of the attribute information acquired by the acquisition section 151, the code image acquired through the conversion performed by the conversion section 152, and the label image generated by the generation section 153 on one or more media such that an image group which corresponds to one set is formed on one piece of medium.

The calculation section 155 calculates the size of the area of the medium in which the image group is formed. The selection section 156 selects a medium, in which the relationship of the size calculated by the calculation section 155 satisfies a predetermined condition, from among plural media which have respectively different sizes. The information acquisition section 157 acquires information relative to performance of at least one of the image forming function and the image reading function of the apparatus. The acquisition section 151, the conversion section 152, the generation section 153, the image forming section 154, the calculation section 155, the selection section 156, and the information acquisition section 157 are realized by the software process performed by the control unit 101.

The server apparatus 200 includes a second acquisition section 251, a third acquisition section 252, and a transmission section 253. The second acquisition section 251 acquires a code which is read from the publication. The third acquisition section acquires the set of the attribute information, the identification information, and the label information, which is specified by the code acquired by the second acquisition section 251. The transmission section 253 transmits the set of the attribute information, the identification information, and the label information, which is acquired by the third acquisition section, to the image processing apparatus 100. The second acquisition section 251, the third acquisition section 252, and the transmission section 253 are realized by the software process performed by the control unit 210. In addition, the code affixed to the publication includes a code, which is attached to the publication in a detachable state, in addition to the code which is printed on the publication and the code which is affixed to the publication. Meanwhile, the code is the system of a sign and a mark to express information, and a call mark is included in the exemplary embodiment in addition to various bar codes and QR codes (registered trademark).

Operation

Figure 8:
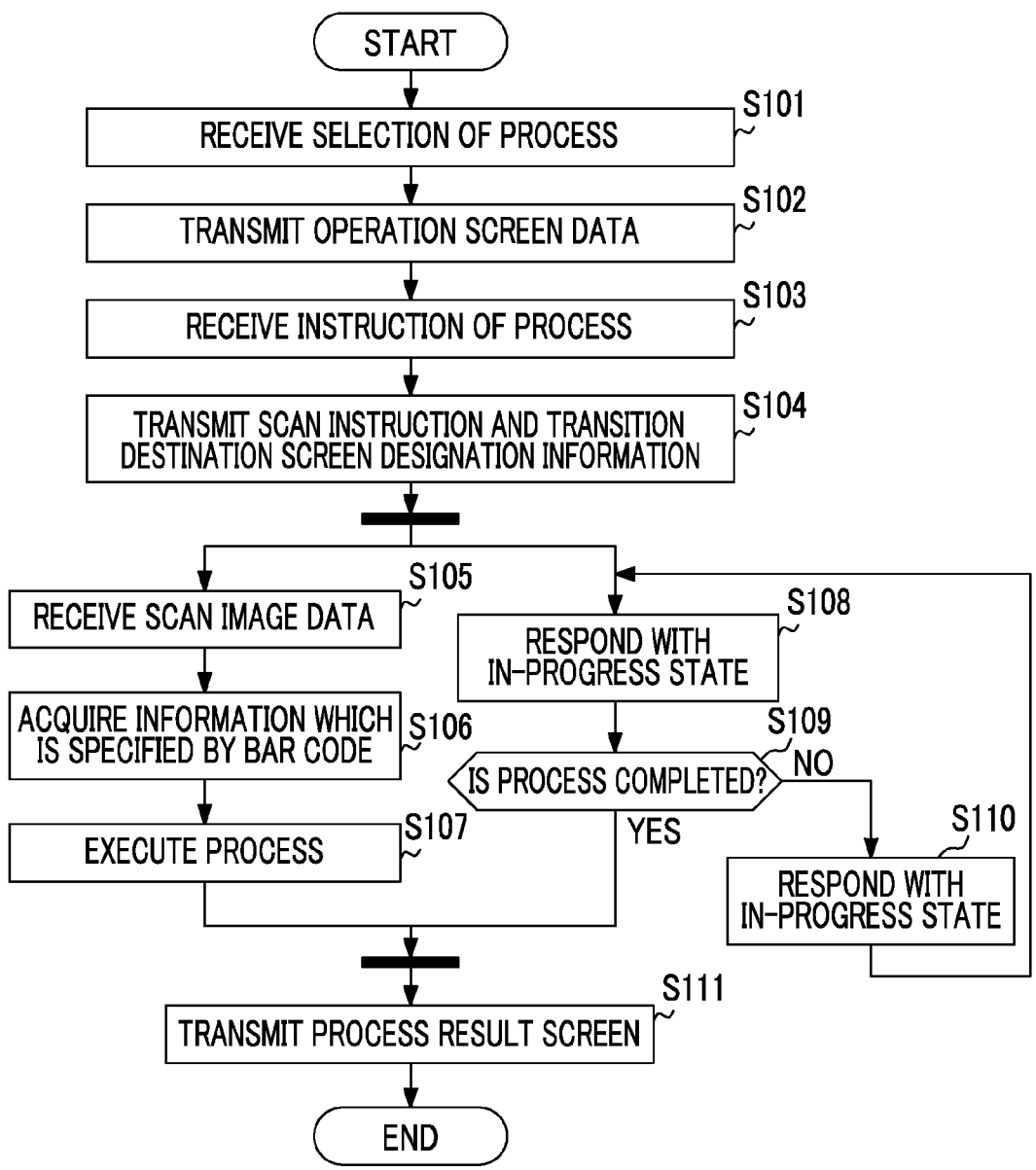
FIG. 8 is a flowchart illustrating the basic operation of the server apparatus.
Figure 9:
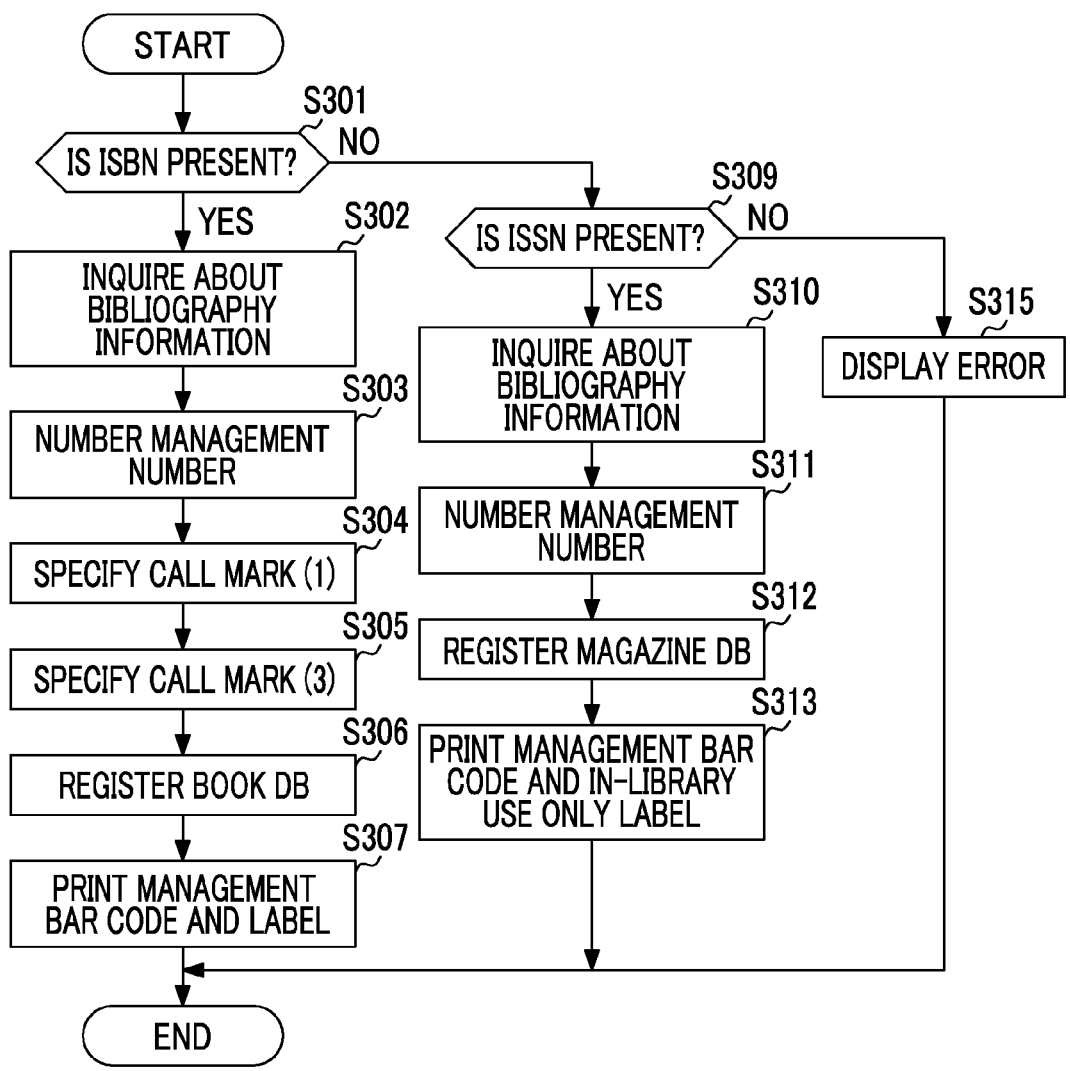
FIG. 9 is a flowchart illustrating the operation of the server apparatus when a database is registered.
Figure 10:
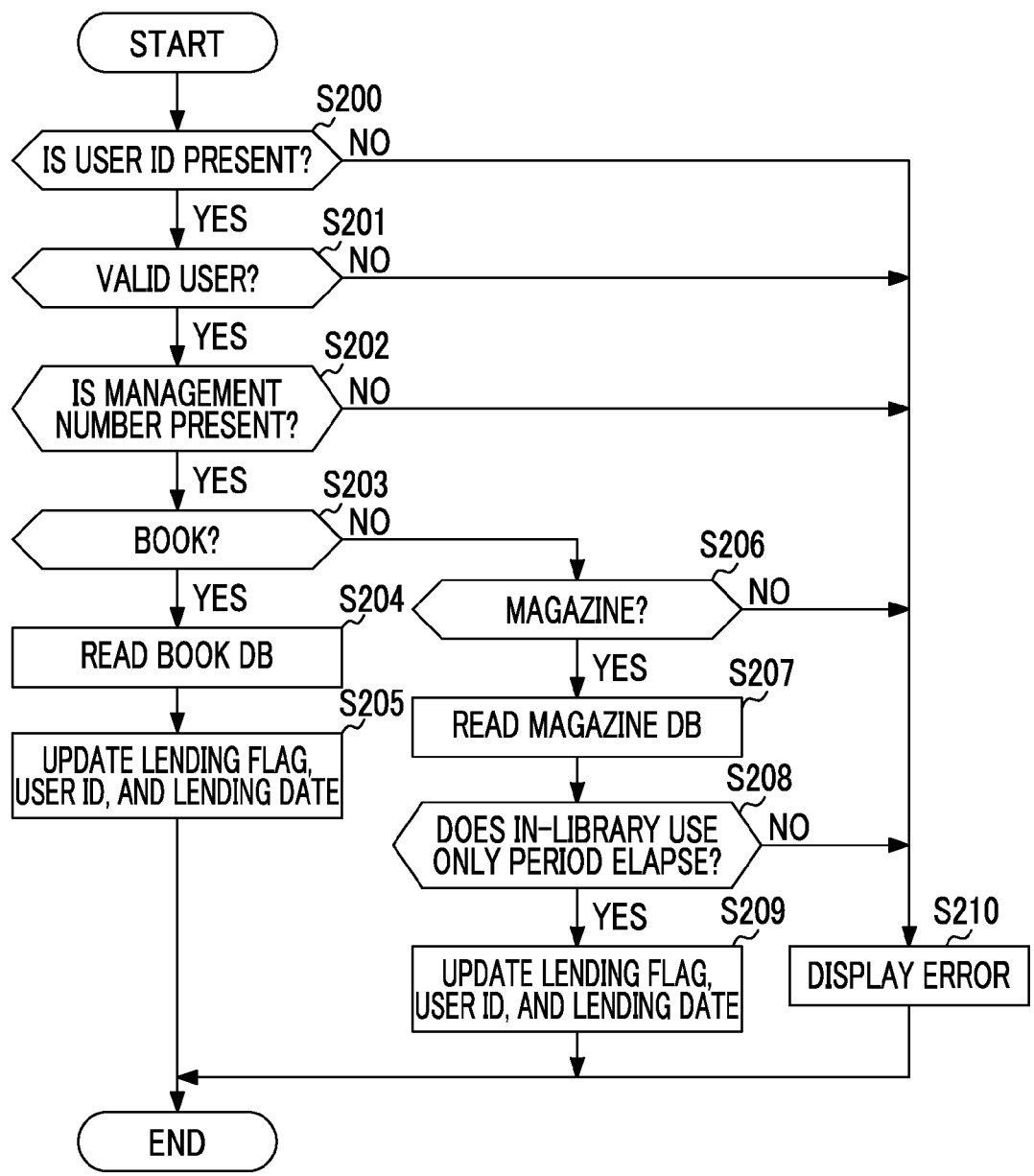
FIG. 10 is a flowchart illustrating the operation of the server apparatus when a book is lent.
Figure 11:
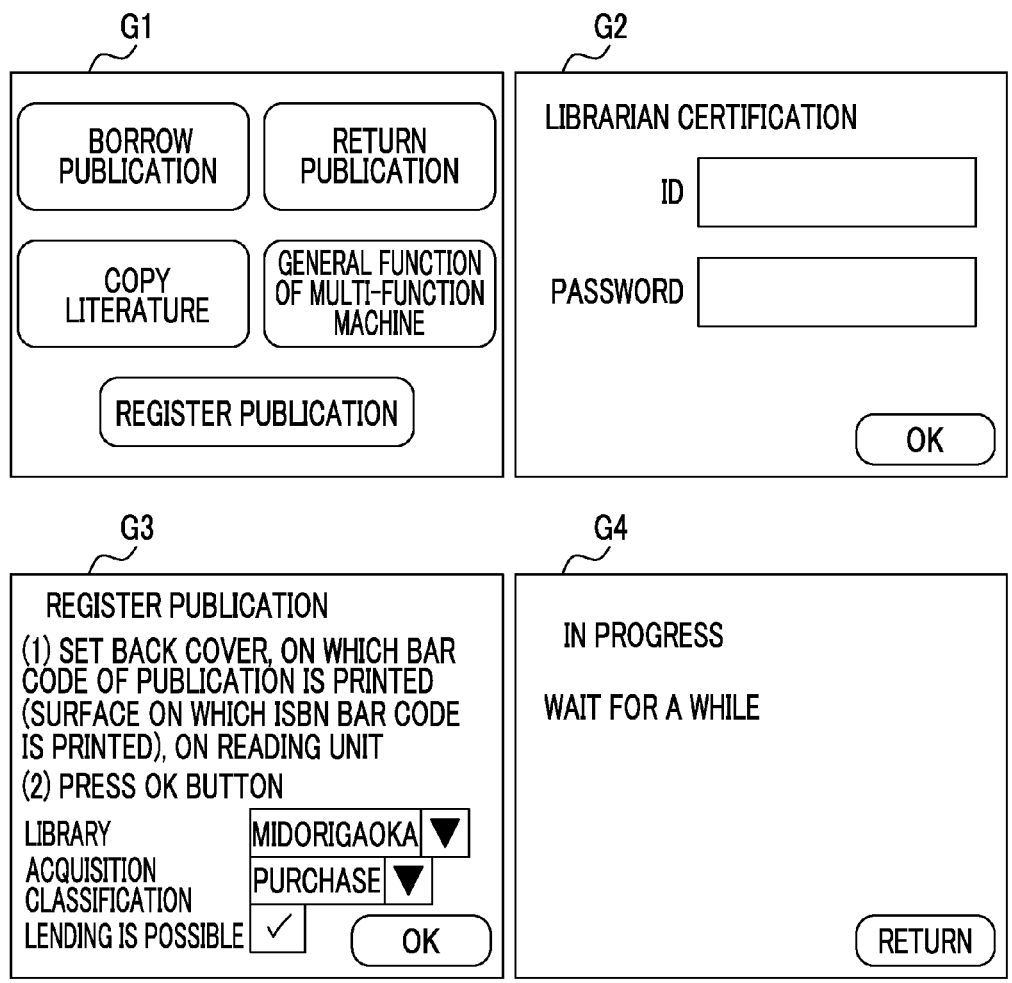
FIG. 11 is a diagram illustrating an example of a screen displayed on the image processing apparatus.
Figure 12:
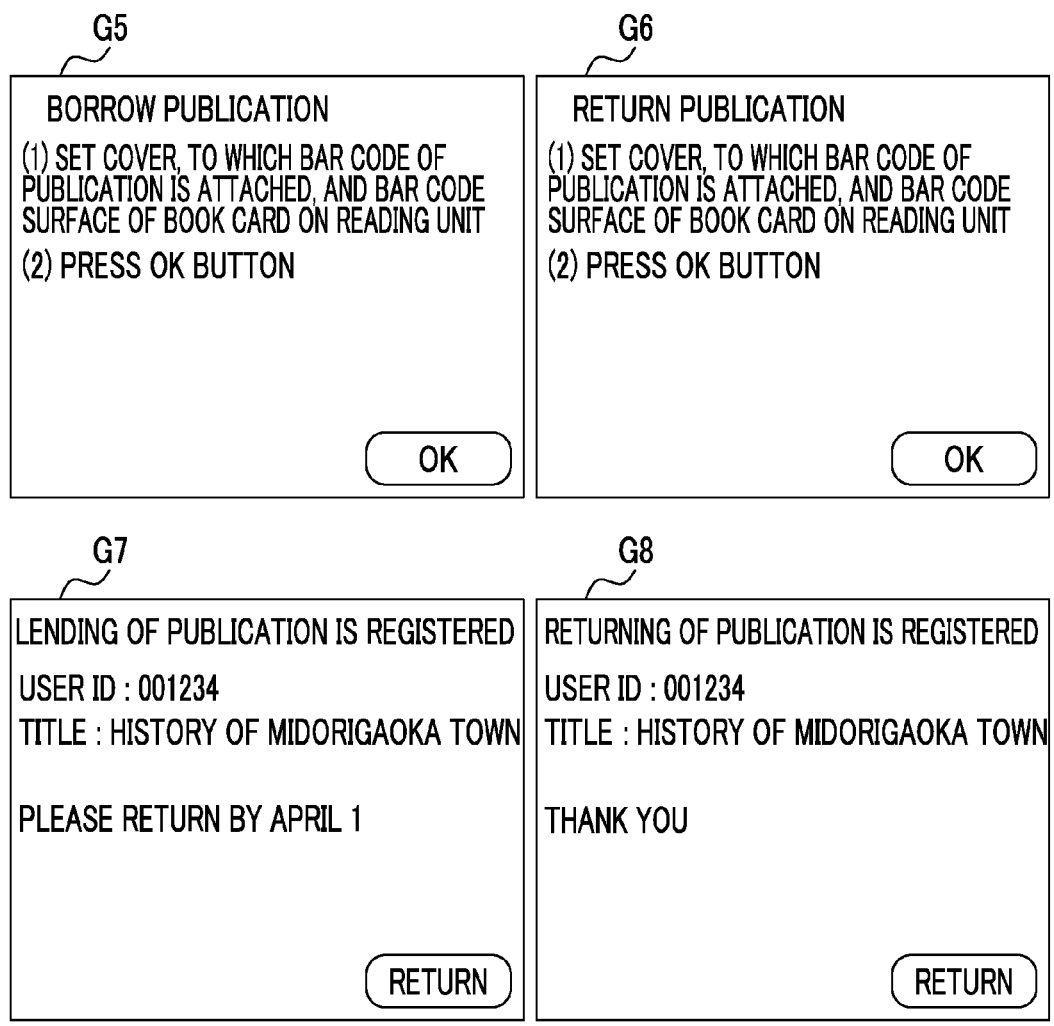
FIG. 12 is a diagram illustrating an example of a screen displayed on the image processing apparatus.
Figure 13:
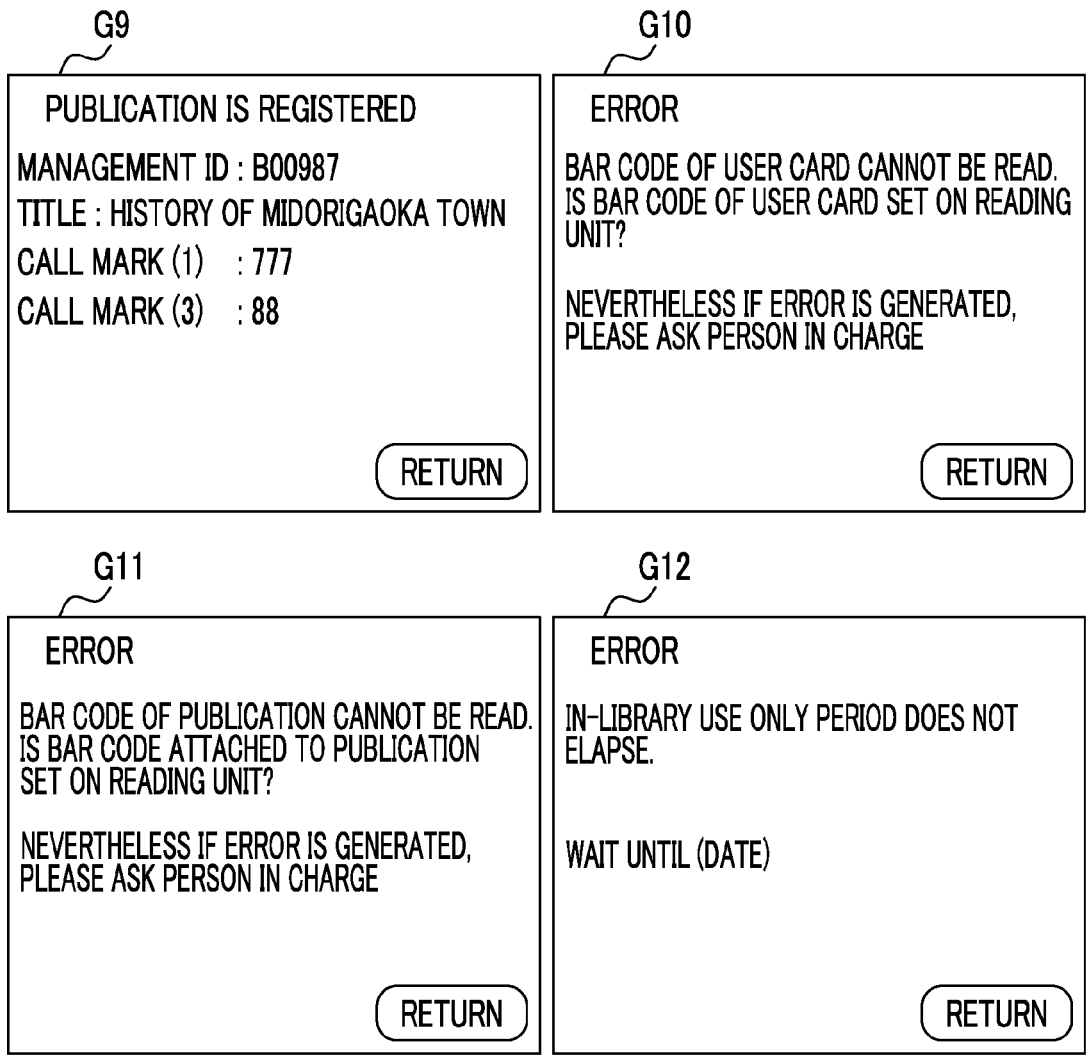
FIG. 13 is a diagram illustrating an example of a screen displayed on the image processing apparatus.

FIGS. 8 to 10 are flowcharts illustrating the operation of the server apparatus 200, and FIGS. 11 to 13 are diagrams illustrating examples of a screen which is displayed on the image processing apparatus 100. FIG. 8 illustrates the basic operation of the server apparatus 200, and FIGS. 9 and 10 illustrate a detailed process in step S107 of FIG. 8.

Basic Operation

First, a process selection screen G1 shown in FIG. 11 is displayed in the UI unit 106 of the image processing apparatus 100. A user selects a desired process on the process selection screen G1. From among soft buttons on which processes to "borrow publication", "return publication", "copy document" and "register publication", and "general function of multi-function machine" are written as shown in FIG. 11, Uniform Resource Locators (URLs) are respectively associated with the soft buttons of "borrow publication", "return publication", and "register publication". When the user selects any one of the processes to "borrow publication", "return publication", and "register publication", the control unit 101 of the image processing apparatus 100 transmits a Hyper Text Transfer Protocol (HTTP) request to the URL which is associated with the selected process. In contrast, when the process to "copy document" is selected by the user, the control unit 101 of the image processing apparatus 100 reads screen data, which is used to perform so-called copying, from the storage unit 102, and displays a screen according to the data on the UI unit 106. In addition, when "general function of multi-function machine" is selected, the control unit 101 of the image processing apparatus 100 reads data, which is used to display a general menu screen listed with options, such as copy, scan, and facsimile, on the multi-function machine, from the storage unit 102, and displays the screen on the UI unit 106. Meanwhile, all of the above-described processes may not be provided to all users. That is, some processes among all of the processes may be provided to the all users, and the other processes may be provided to only specific users. At this time, a method for certifying a user before the process screen G1 is displayed and then displaying the process screen G1 displayed with a process which may be used by the certified user, or a method for displaying the process screen G1 displayed with a process which may be used by all of the users at first and then displaying a process which may be used by the certified user after certifying is performed may be considered. A normal user and a specific user may change the display screen itself. For example, setting may be performed such that the process to "register the publication" is provided to only a librarian. The process to "register the publication" is not displayed on the process screen G1 for the normal user, the control unit 101 reads data, which is used to display a librarian-dedicated process selection screen, from the storage unit 102 after the certification is successful using an ID and a password or the like on a librarian-dedicated login screen G2, and displays a screen, which includes the soft button on which "register the publication" is written, on the UI unit 106.

Here, a case in which the user performs an operation to select any one of the processes to "borrow publication", "return publication", and "register publication" in the image processing apparatus 100 will be described as an example. In this case, the control unit 101 of the image processing apparatus 100 transmits an HTTP request to an URL which is associated with the selected process. Since all of the processes are performed by the server apparatus 200 in the example, the URL is the URL of the server apparatus 200, and the control unit 210 of the server apparatus 200 receives the selection of the process by accepting the HTTP request in step S101 of FIG. 8. Further, the control unit 210 reads an operation screen data according to the HTTP request from the storage unit 220 and transmits the operation screen data to the image processing apparatus 100 in step S102.

The control unit 101 of the image processing apparatus 100 displays an operation screen according to the received operation screen data on the UI unit 106. For example, when a library newly acquires the publication and registers the publication, a registration screen G3 (FIG. 11) is displayed on the UI unit 106. When a publication, which is newly acquired in a library, is lent (the user borrows the publication), a lending process screen G5 (FIG. 12) is displayed on the UI unit 106. When the user returns the publication, a returning process screen G6 (FIG. 12) is displayed on the UI unit 106. When the publication is registered, the back cover 2 on which the ISBN bar code 21 of the publication is printed is set for the image reading unit 104 of the image processing apparatus 100, necessary information is input to an input box which is provided on the registration screen G3, and then a soft button, on which "OK" is written (hereinafter, called an OK button), is selected. Therefore, the identifier of the OK button, information about the value thereof, and information which is input to the input box are transmitted to the URL associated by the FORM tags of a Hyper Text Markup Language (HTML) on the registration screen. In addition, when the publication is lent or returned, the user sets the cover 1 of the publication to which the management bar code 11 is attached and the surface of the user card 4 on which the user ID bar code is printed on platen glass which is included in the image reading unit 104 of the image processing apparatus 100, and selects an OK button on the lending process screen G5 or the returning process screen G6. Therefore, the image reading unit 104 reads the plural codes from one publication on the platen glass at one scan. At this time, plural publications are placed on the platen glass at the same time and codes may be read from the plural publications at one scan. In addition, the user card is also placed on the platen glass and codes may be read from the user code. The identifier of the OK button and information about the value thereof are transmitted to the URL associated by the FORM tags of the HTML on the screens. The control unit 201 of the server apparatus 200 receives an instruction of process by accepting the pieces of information in step S103. Meanwhile, setting may be performed such that hard buttons provided in the image processing apparatus 100 receive the same instructions as the soft buttons. In addition, the hard buttons of the image processing apparatus may substitute for the functions of the soft buttons without displaying the soft buttons on the UI unit 106.

The control unit 210 of the server apparatus 200 transmits a scan instruction and transition destination screen designation information to the image processing apparatus 100 in step S104. The scan instruction includes parameters, which are used when scanning is performed, such as the resolution of the scan (for example, 300 dpi (dot/inch)), monochrome, and an image format (for example, the TIFF format), and an URL which indicates the destination of scan image data. The transition destination screen designation information is path information such as the URL which means the storage destination of screen data.

The control unit 101 of the image processing apparatus 100 reads an image using the image reading unit 104 according to the received scan instruction, and generates image data according to a parameter designated by the server apparatus 200. The control unit 101 transmits the generated image data to a designated destination. The control unit 101 adds meta information (certified user information, the address of the image processing apparatus, and the like) to the scan image data in addition to the parameters acquired when scanning is performed, if necessary.

The control unit 210 of the server apparatus 200 receives the scan image data which is transmitted from the image processing apparatus 100 in step S105. Further, the control unit 210 acquires information which is specified by the bar codes included in the scan image data in step S106. When the plural bar codes are included in the scan image data, the control unit 210 acquires the plural pieces of information which respectively correspond to the bar codes. Further, the control unit 210 determines whether or not it is possible to execute a process using the acquired information. When it is determined that it is possible to execute the process, the control unit 210 executes the process based on the acquired information in step S107. The details of each process will be described later.

In steps S105 to S107, the control unit 101 of the image processing apparatus 100 designates an URL which is designated based on the transition destination screen designation information, and requests a state display screen from the server apparatus 200. When the process in step S107 is not completed in step S109 (No), the control unit 210 of the server apparatus 200 transmits in-progress screen data (in-progress screen G4 of FIG. 11) to the image processing apparatus 100 in steps S108 and S110. In addition, the control unit 210 transmits normal ending screen data (process result screens G7 and G8 of FIG. 12 and a process result screen G9 of FIG. 13) when the process in step S107 normally ends in step S109 (Yes), and transmits an error screen (process result screens G10, G11 and G12 of FIG. 13) to the image processing apparatus 100 when the process is erroneously ended in step S111.

Registration Operation

Subsequently, the process in step S107 (FIG. 8) performed when the publication is registered will be described with reference to FIG. 9. The control unit 210 of the server apparatus 200 decodes one or more bar codes which are included in the scan image data, and acquires one or more pieces of information which are specified from the respective bar codes. It is determined whether or not a letter string indicative of the ISBN is included in the information in step S301. In order to identify various pieces of information, such as the ISBN, the ISSN, a user ID, and the management number of a book or a magazine, a method for determining the various pieces of information using respective prefixes may be considered. More specifically, the ISBN is a 13-digit numerical value which starts with 987, the ISSN is a 13-digit numerical value which starts with 977, the user ID starts with, for example, a specific prefix, such as A (for example, A0012345), the management number of a book starts with, for example, a specific prefix, such as YB (for example, YB00012), and the management number of a magazine starts with, for example, a specific prefix, such as YM (for example, YM0002222). The control unit 210 determines the type of the information based on the prefixes. In addition, the number of digits of each piece of information or a so-called check digit may be used. In addition, the type of the information may be determined based on the type of the bar code or may be determined based on the peripheral image (guide image or the like) of the bar code or the location of the bar code.

When the ISBN is acquired in step S301 (Yes), the control unit 210 designates the ISBN and inquires about bibliography information from the bibliography information storage apparatus 300 in step S302. When the bibliography information is acquired, the control unit 210 numbers the management number in step S303. The control unit 210 specifies the call mark (1) corresponding to the book classification code included in the acquired bibliography information with reference to the classification table 223 in step S304. Subsequently, the control unit 210 specifies the call mark (3) for the specified call mark (1) in step S305. The control unit 210 adds a new record to the book DB 221, and registers necessary information in step S306. The control unit 210 prints the label 31, which includes the management bar code 11 of the management number, the call mark (1) and the call mark (3), using the image formation unit 103 based on the registered information in step S307. Meanwhile, the process in step S307 will be described in detail later. The prepared management bar code 11 and the label 31 are attached to the book.

In contrast, when the ISSN is acquired in step S301 (No) and step S309 (Yes), the control unit 210 designates the ISSN and inquires about the bibliography information from the bibliography information storage apparatus 300 in step S310. When the bibliography information is acquired, the control unit 210 numbers the management number in step S311. The control unit 210 adds a new record to the magazine DB 222, and registers necessary information in step S312. The control unit 210 prints the management bar code 11 of the management number and the in-library use only label 12 using the image formation unit 103 in step S313. The prepared management bar code 11 and the in-library use only label 12 are attached to the magazine. Meanwhile, the process in step S313 will be described in detail later.

Meanwhile, when the ISBN and the ISSN are not acquired in step S301 (No) and step S309 (No), the control unit 210 determines that it is not possible to register the publication, and instructs the image processing apparatus 100 to perform error display in step S315. That is, the determination performed in steps S301 and S309 corresponds to determination which indicates whether or not it is possible to perform publication registration which is the requested process. In this case, the image processing apparatus 100 may be caused to read the cover and the back cover of the publication and to perform an Optical Character Recognition (OCR) process, and the result of the OCR process may be used as the bibliography information.

In addition, in the above-described example, the publication registration and the printing of the management bar code and the label are performed in a series of procedures. However, it is not necessary to perform the publication registration and the printing of the management bar code and the label in a series of procedures, and printing may be performed after, for example, several days or the like after the publication registration is performed.

Operation of Preparing Management Bar Code and Label

Subsequently, the processes in steps S307 and S313 of FIG. 9 will be described with reference to FIGS. 14 to 25. In the example, the control unit 210 of the server apparatus 200 transmits the set of book information including the title of a book or the like, the management number (example of the identification information), and the call mark (1) and the call mark (3) (examples of the label information) to the image processing apparatus 100 based on the information, which is registered in step S306, in step S307 of FIG. 9. In addition, the control unit 210 transmits the set of the magazine information including the title of a magazine, the management number, and lending prohibition period information to the image processing apparatus 100 based on the information, which is registered in step S312, in step S313. The book information and the magazine information are examples of the attribute information which indicates the attribute of the publication. Hereinafter, plural operation examples from a first operation example to a twelfth operation example will be sequentially described as the operation example of step S307 and step S313 of FIG. 9 with reference to the drawings.

First Operation Example

Figure 14:
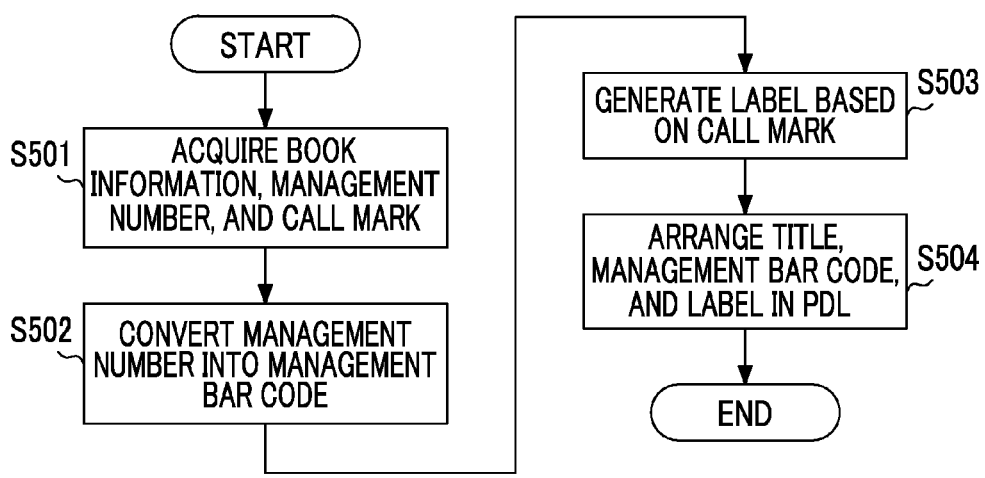
FIG. 14 is a flowchart illustrating the operation of the image processing apparatus.

FIG. 14 is a flowchart illustrating the flow of a process to prepare the management bar code 11 and the label 31 (process in step S307 of FIG. 9) performed by the image processing apparatus 100. The control unit 101 of the image processing apparatus 100 receives (acquires) the set of the book information, the management number, the call mark (1) and the call mark (3) from the server apparatus 200 in step S501. The control unit 101 converts the received management number into the management bar code 11 (example of the code image) in step S502. For example, the code 39 may be used as the code system of the bar code acquired through conversion. In addition, a 2-dimensional code, such as the QR code, may be used. When the management bar code 11 is read by the image processing apparatus 100 with the minimum resolution (generally, 200 dpi) which may be scanned, the management bar code 11 may be prepared with a size which may be interpreted. At this time, the control unit 101 may add additional information, such as a library name or a position name, at the upper part or the lower part of the management bar code 11. The additional information may be stored in the storage unit of the image processing apparatus 100 in advance.

The control unit 101 generates the image of the label 31 based on the received call mark (1) and call mark (3) in step S503. The label 31 may be prepared in such a way that the call mark (1) and the call mark (3) are synthesized with the label image which is registered in the image processing apparatus 100 in advance. The control unit 101 forms an image which expresses the title of a book included in the book information, the management bar code 11, and the label 31 on one piece of medium in step S504.

Figure 26:
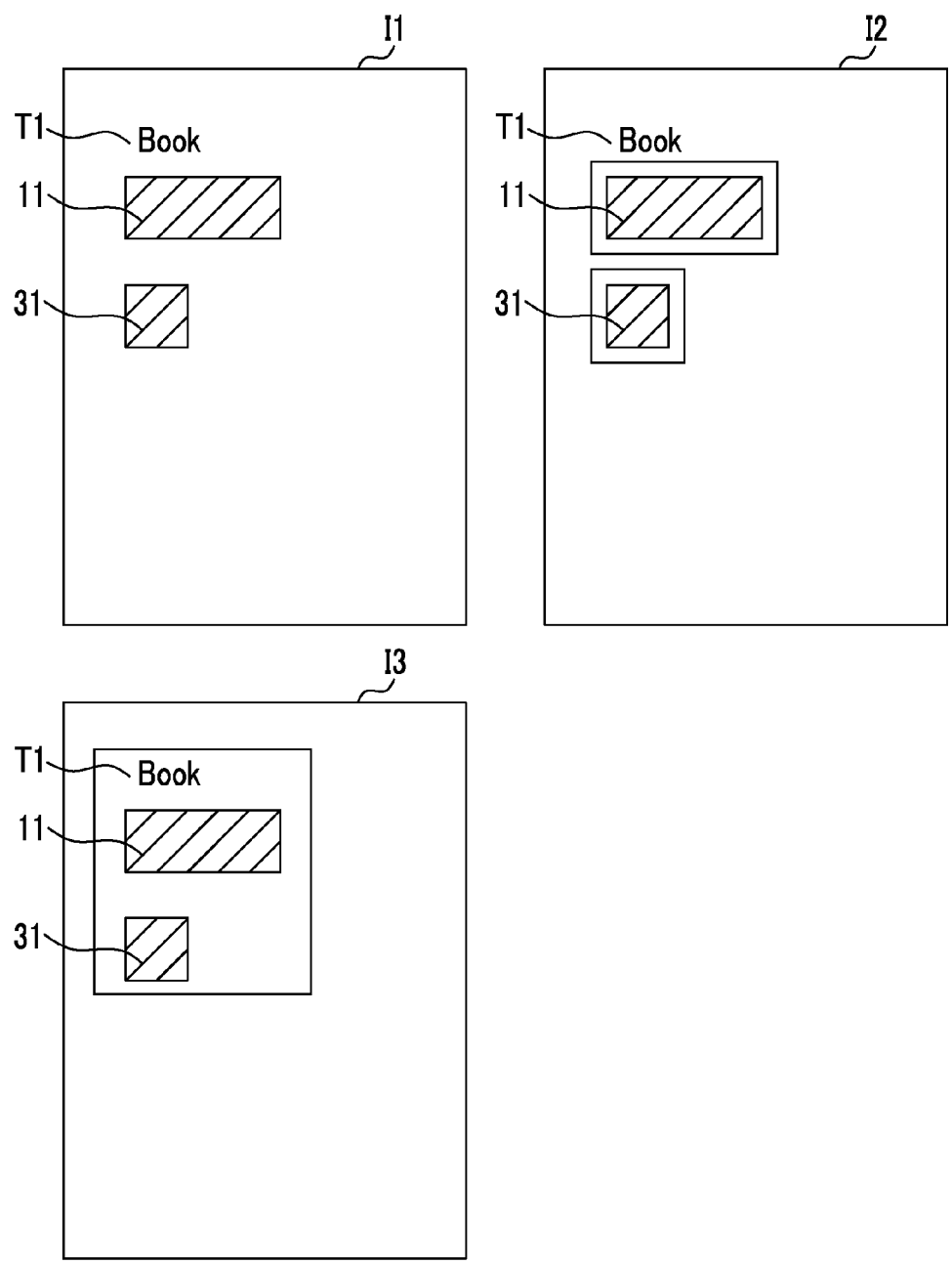
FIG. 26 is a diagram illustrating an example of an image which is formed on a medium by the image processing apparatus.

An image I1 of FIG. 26 is an example of the image which is formed on the medium in step S504. In the example, the images of a title T1 of the book, the management bar code 11, and the label 31 which includes the call mark (1) and the call mark (3) are formed on one piece of medium of an A4 size. In the example, the control unit 101 arranges the title T1, the management bar code 11, and the label 31 in the drawing area (hereinafter, simply called "PDL") which is expressed using a Page Description Language (PDL). The control unit 101 first arranges the title T1 of the publication to be left-aligned. The title T1 of the publication may be embedded as a letter string, and may be arranged after being converted into a font image. When the title T1 is long and thus the title T1 is not included on the page with a single line, a line is changed after the title goes one side end of the page. The control unit 101 arranges the management bar code 11 on a subsequent line of the title T1, and arranges the label 31 on a subsequent line of the management bar code 11. Meanwhile, in the example, although the control unit 101 uniquely determines the arrangement positions of the title T1, the management bar code 11, and the label 31 (hereinafter, called an "image group"), an image group arrangement method is not limited thereto. For example, a template in which the arrangement method is written is stored in the storage unit of the image processing apparatus 100 in advance, and the control unit 101 may arrange the image group with reference to the template stored in the storage unit. The operator cuts the management bar code 11 and the label 31, which are formed on the medium, from the medium, and attaches the management bar code 11 and the label 31 to the registered publication.

Second Operation Example

Figure 15:
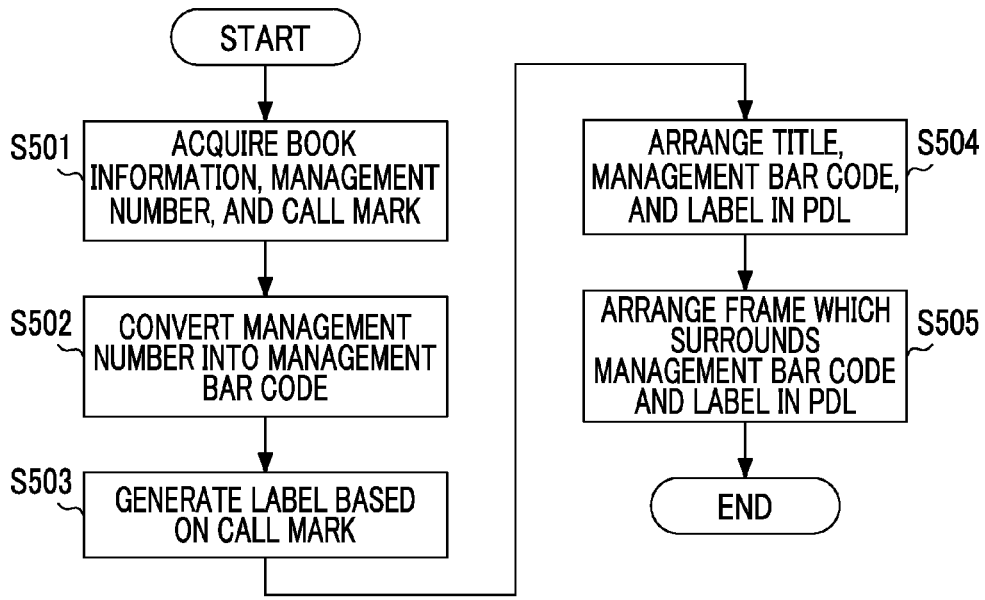
FIG. 15 is a flowchart illustrating the operation of the image processing apparatus.

FIG. 15 is a flowchart illustrating another example of a process to prepare the management bar code 11 and the label 31, which is performed by the image processing apparatus 100. The flowchart shown in FIG. 15 is different from the flowchart shown in FIG. 14 in that the process in step S505 is performed in addition to the processes in steps S501 to S504 of FIG. 14. In FIG. 15, the control unit 101 arranges frames (examples of a first frame image and a second frame image), which surround the management bar code 11 and the label 31 arranged in the PDL, in the PDL in step S505.

An image I2 of FIG. 26 is an example of an image which is formed on the medium in the operation example. In the example, the arranged frames are arranged with some space such that the management bar code 11 does not come into contact with the label 31. Meanwhile, the frame which surrounds the management bar code 11 may come into contact with the frame which surrounds the label 31.

When the management bar code 11 and the label 31 are surrounded by the frames, the operator easily performs an operation to cut the management bar code 11 and the label 31 from the medium using scissors or the like. In addition, when the frames are arranged such that the management bar code 11 does not come into contact with the label 31, the management bar code 11 and the label 31 are easily cut, and the management bar code 11 and the label 31 are prevented from being erroneously lost when the management bar code 11 and the label 31 are cut.

Third Operation Example

Figure 16:
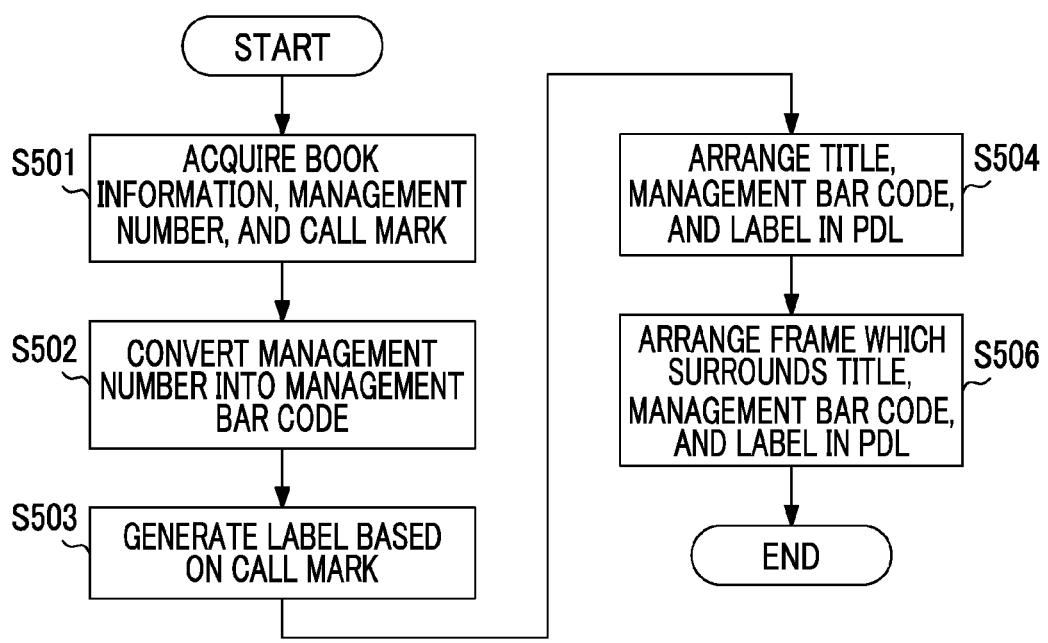
FIG. 16 is a flowchart illustrating the operation of the image processing apparatus.

FIG. 16 is a flowchart illustrating another example of the process to prepare the management bar code 11 and the label 31, which is performed by the image processing apparatus 100. The flowchart shown in FIG. 16 is different from the flowchart shown in FIG. 14 in that the process in step S506 is performed in addition to the processes in steps S501 to S504 of FIG. 14. In FIG. 16, the control unit 101 arranges a frame (example of a third frame image), which surrounds the image group arranged in the PDL, in the PDL in step S506. An image I3 of FIG. 26 is an example of an image which is formed on the medium in the operation example. In the example, the arranged frame is arranged with some space so as not to come into contact with the image group.

When the image group is surrounded by the frame, it is easy to grasp that the title T1 of the book, the management bar code 11, and the label 31 are in association with each other. In addition, when the frames are arranged such that the management bar code 11 does not come into contact with the label 31, the management bar code 11 and the label 31 are easily cut, and the management bar code 11 and the label 31 are prevented from being erroneously lost when the management bar code 11 and the label 31 are cut.

Fourth Operation Example

Figure 17:
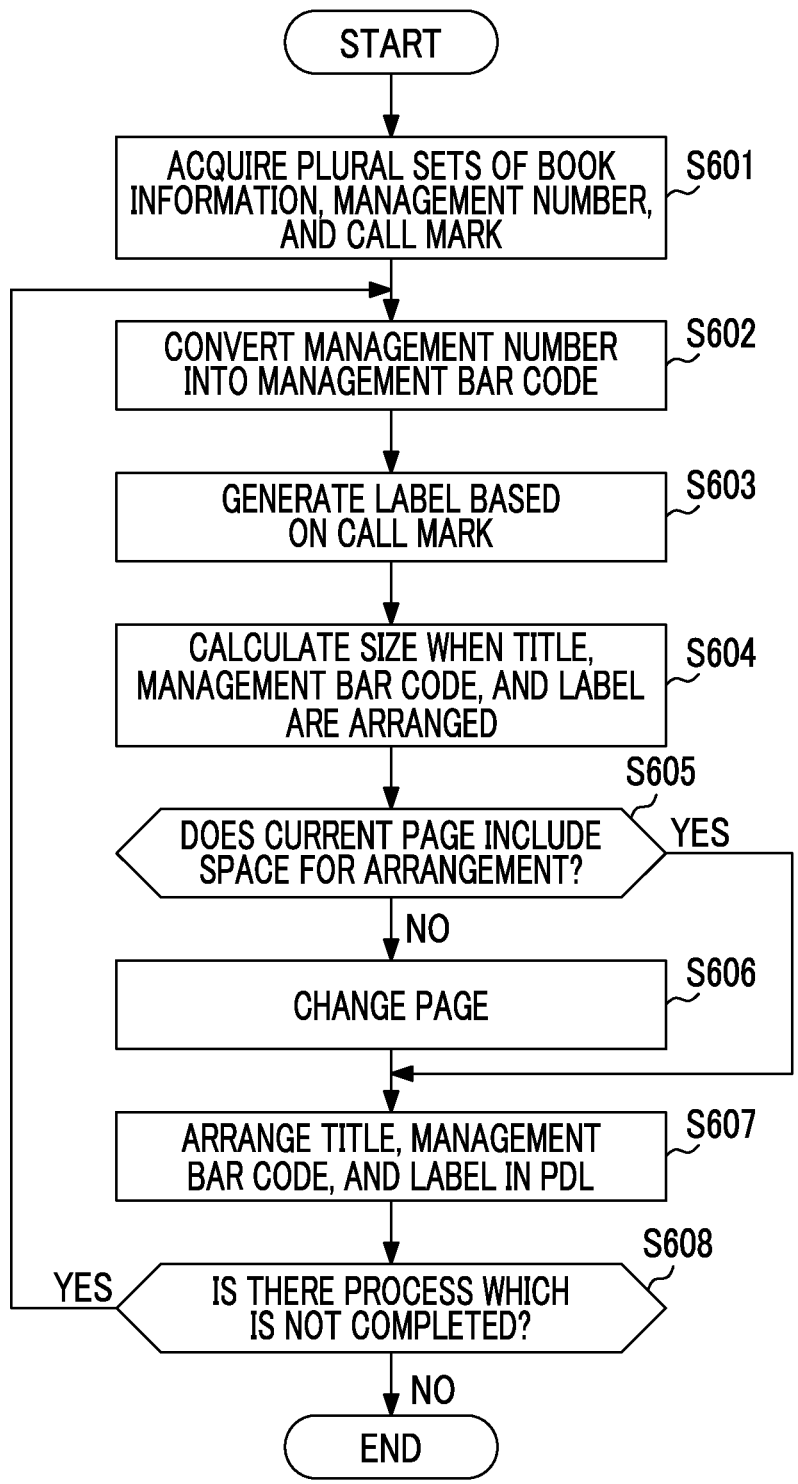
FIG. 17 is a flowchart illustrating the operation of the image processing apparatus.

FIG. 17 is a flowchart illustrating another example of the process to prepare the management bar code 11 and the label 31, which is performed by the image processing apparatus 100. In the example, an operation performed when plural sets of the book information, the management number, the call mark (1) and the call mark (3) are combined and received from the server apparatus 200 will be described.

The control unit 101 receives (acquires) the plural sets of the book information, the management number, the call mark (1) and the call mark (3) from the server apparatus 200 in step S601. The control unit 101 selects one set from among the received plural sets, and performs processes subsequent to a process in step S602 on the selected set. The control unit 101 converts the management number, which is included in the received sets, into the management bar code 11 (example of the code image) in step S602. In addition, the control unit 101 generates the image of the label 31 based on the call mark (1) and the call mark (3), which are included in the received sets, in step S603.

The control unit 101 calculates sizes, acquired when the image group is arranged, before the image group is arranged in the PDL in step S604. The sizes are set to the vertical and horizontal sizes of a rectangular frame which includes the image group. Meanwhile, the rectangular frame may be arranged so as not to come into contact with the image group.

The control unit 101 calculates whether or not there is a space which may arrange the image group having the sizes calculated in step S604, in the current page of the PDL in step S605. In the calculation, a general algorithm for rectangular arrangement is used. It does not matter whether the space where it is possible to arrange the image group having the calculated sizes is in a vertical orientation or a horizontal orientation. When there is not a space where the image group having the calculated sizes is arranged in step S605 (NO), the control unit 101 changes the page for the PDL in step S606. When there is a space where it is possible to arrange the image group having the calculated sizes in step S605 (YES) or when a page is changed, the control unit 101 arranges the image group in the space in step S607. The control unit 101 determines whether or not there is a process, which is not completed, from among the received plural sets in step S608. When there is a set which is not completed in step S608 (YES), the control unit 101 selects a set of a subsequent book, and repeats the processes subsequent to the process in step S602. When the processes of the sets of all of the books are completed, the control unit 101 ends the process.

Figure 27:
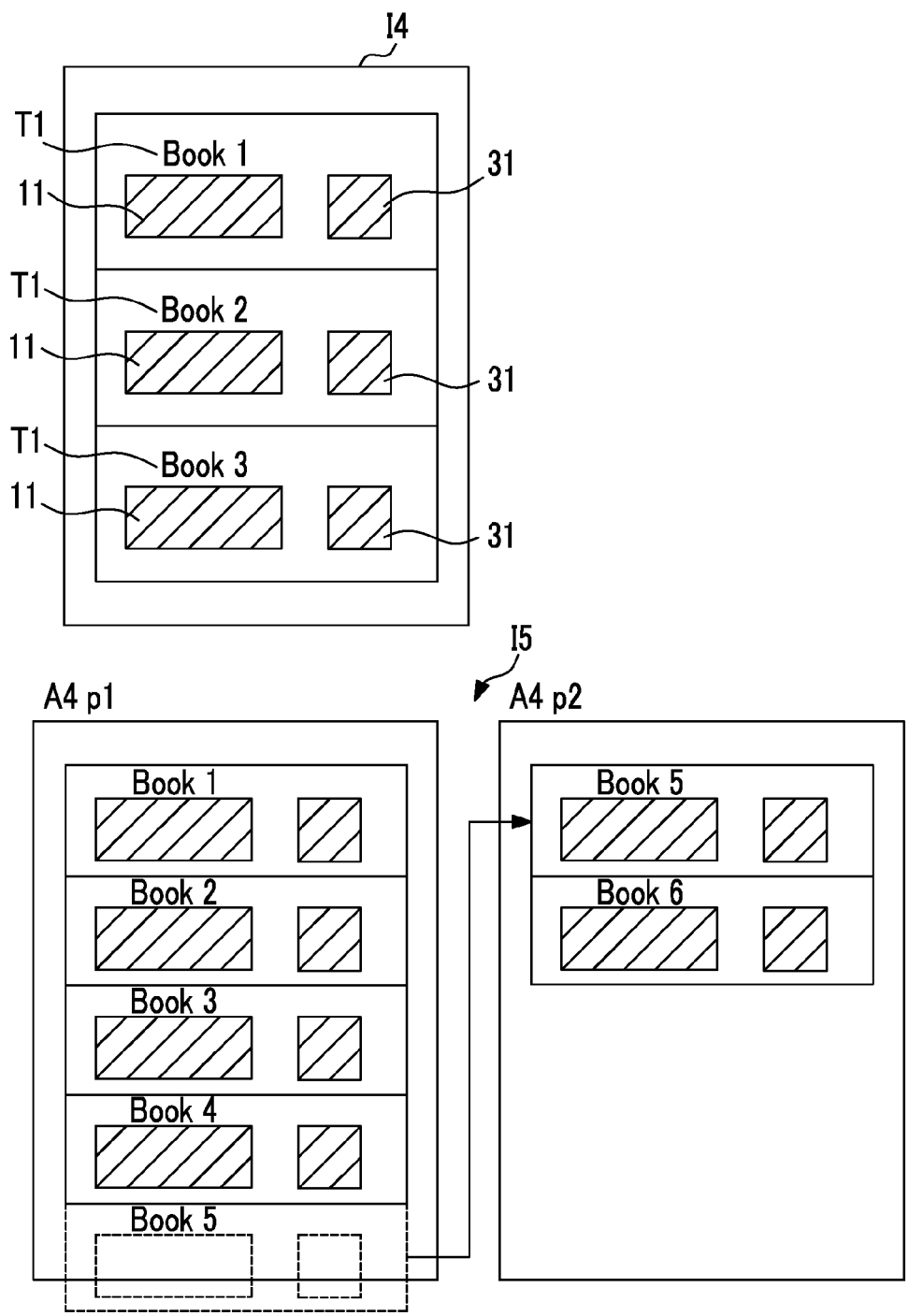
FIG. 27 is a diagram illustrating an example of an image which is formed on the medium by the image processing apparatus.

Images I4 and I5 of FIG. 27 are examples of the image which is formed on the medium in the operation example. As shown in the image I4, plural image groups are formed on one piece of medium. In addition, when the plural image groups are not included in the one piece of medium, image groups are formed after being separated into plural media as shown in the image I5. At this time, the arrangement of the image groups is determined such that the page is changed in a position where an image group corresponding to one set is not separated into plural pages.

Fifth Operation Example

Figure 18:
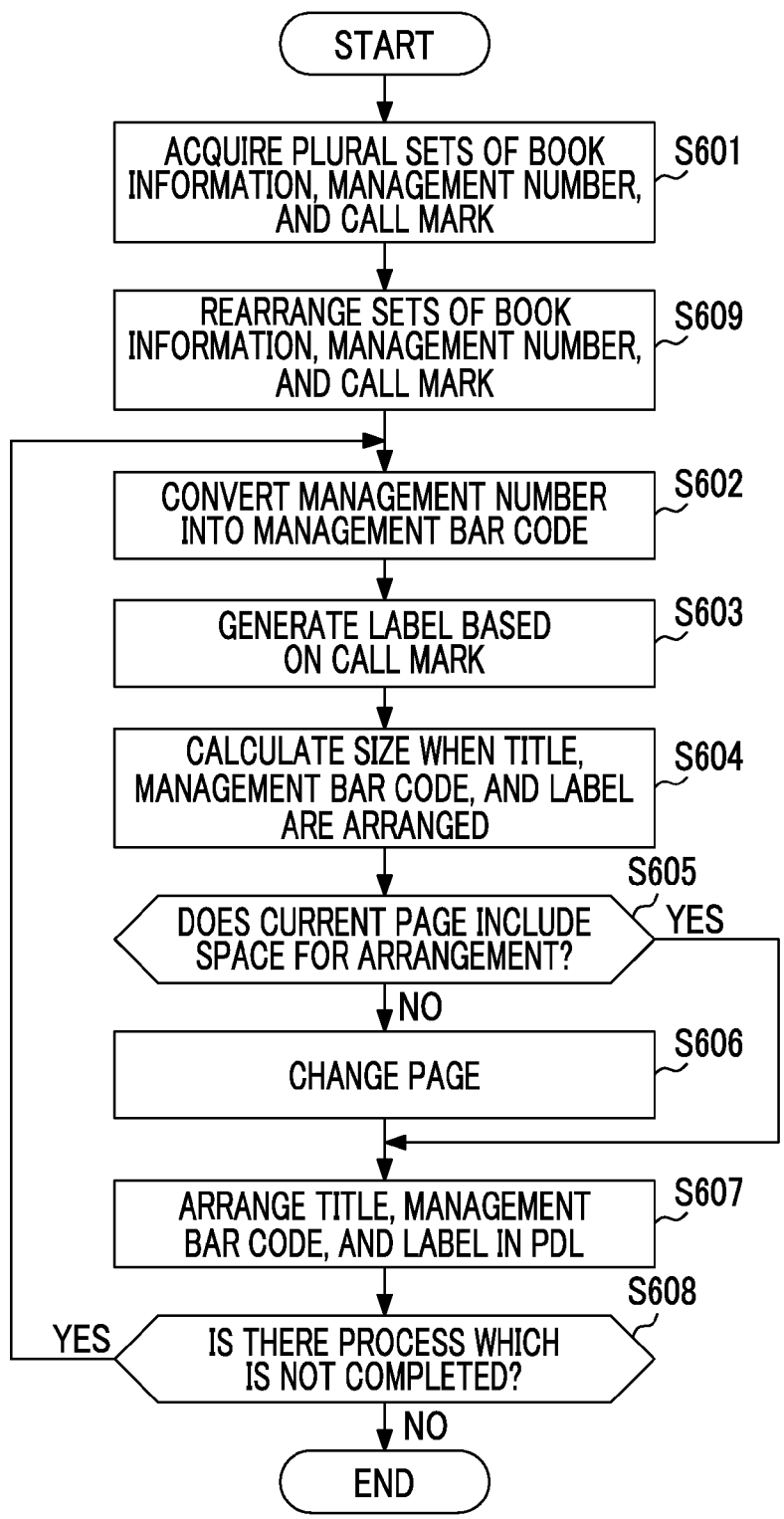
FIG. 18 is a flowchart illustrating the operation of the image processing apparatus.
Figure 28:
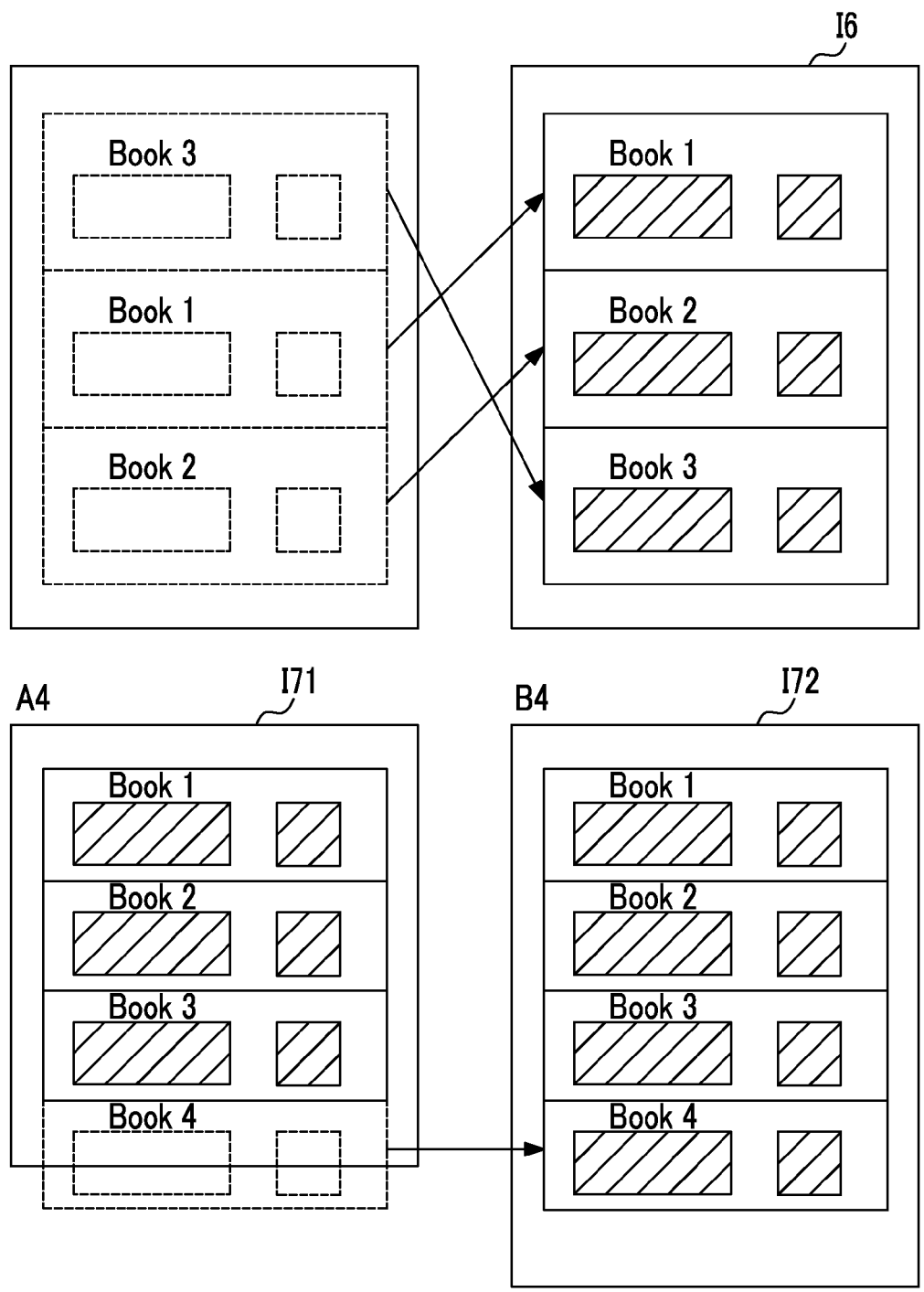
FIG. 28 is a diagram illustrating an example of an image which is formed on the medium by the image processing apparatus.

FIG. 18 is a flowchart illustrating another example of the process to prepare the management bar code 11 and the label 31, which is performed by the image processing apparatus 100. The flowchart shown in FIG. 18 is different from the flowchart shown in FIG. 17 in that a process in step S609 is performed after the process in step S601 is performed. The control unit 101 rearranges (sorts) the plural sets received from the server apparatus 200 based on at least one of the book information (for example, title), the management number, the call mark (1), and the call mark (3) which are included in each of the sets in step S609. A rearrangement method may be performed in ascending order or descending order, and may be set by the operator. An image I6 of FIG. 28 shows an example in which plural image groups are rearranged depending on titles.

Sixth Operation Example

Figure 19:
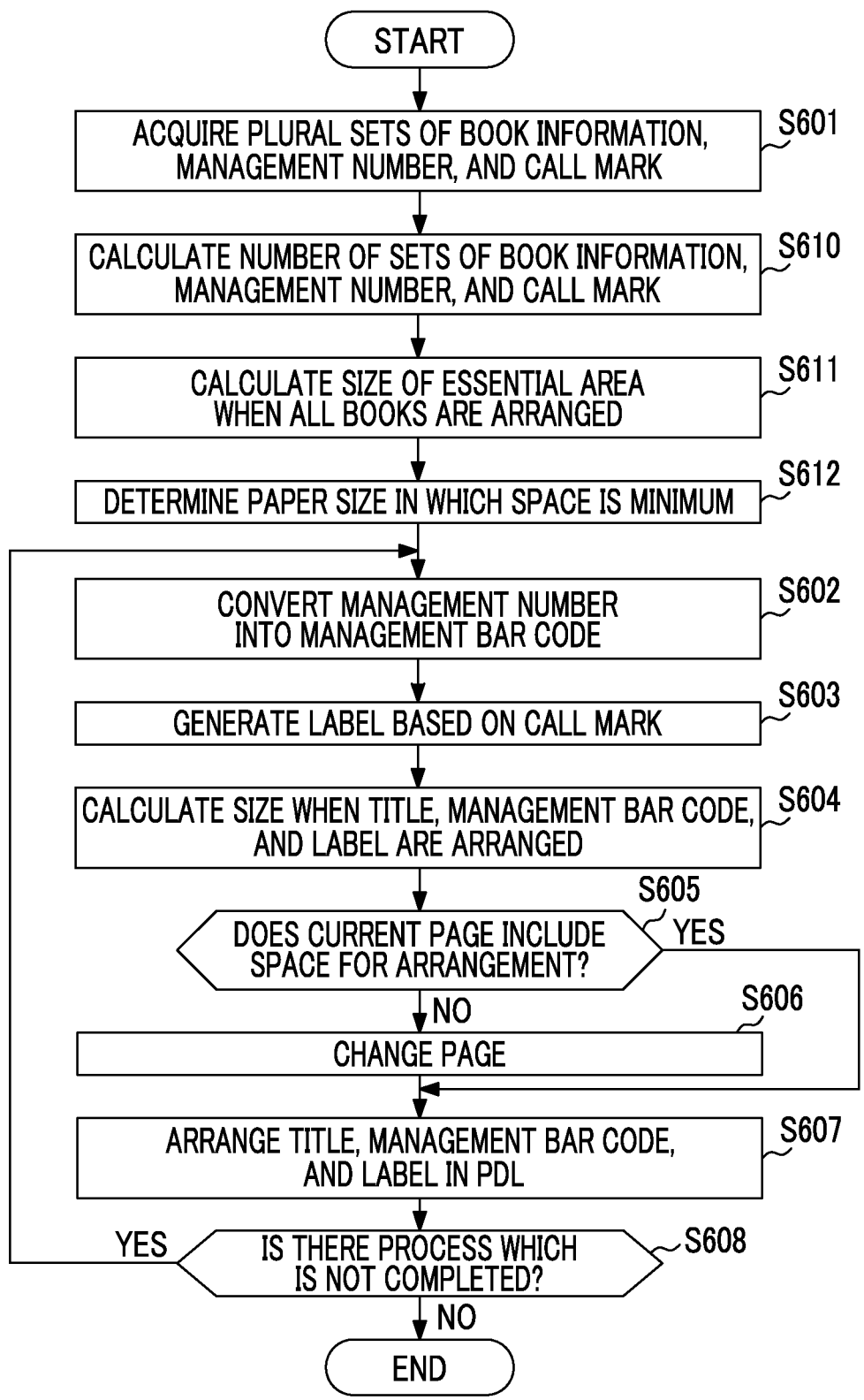
FIG. 19 is a flowchart illustrating the operation of the image processing apparatus.

FIG. 19 is a flowchart illustrating another example of the process to prepare the management bar code 11 and the label 31, which is performed by the image processing apparatus 100. The flowchart shown in FIG. 19 is different from the flowchart shown in FIG. 17 in that processes in steps S610 to S612 are performed after the process in step S601 is performed. The control unit 101 calculates the number of the plural sets received from the server apparatus 200 in step S610. The control unit 101 calculates the size of the minimum image group (hereinafter, referred to as a "minimum size") when image groups corresponding to the received plural sets are arranged in the PDL in step S611. The minimum size includes the vertical size and the horizontal size of a rectangular frame which includes the image groups. Meanwhile, the rectangular frame may be arranged so as not to come into contact with the image groups.

The control unit 101 selects a medium, in which the relationship with the minimum size calculated in step S611 satisfies a condition determined in advance, from among the plural types of media which have respectively different sizes. In the example, when an image group is formed with the calculated minimum size, the control unit 101 selects a medium having a size in which the space is the minimum in step S612.

In the operation example, when the plural image groups are not settled into a piece of A4 medium as shown in images 171 and 172 of FIG. 28, the image groups are not formed in two pieces of A4 media. Instead, the image groups are formed in apiece of B4 medium. In this case, a space is reduced compared to a case in which two pieces of A4 are used. Meanwhile, when a minimum paper size is set to a size which is larger than an A3 size, the control unit 101 may select an A4 size. The reason for this is that the largest paper size of a medium which is used in a general image processing apparatus installed in an office is A3.

Seventh Operation Example

Figure 20:
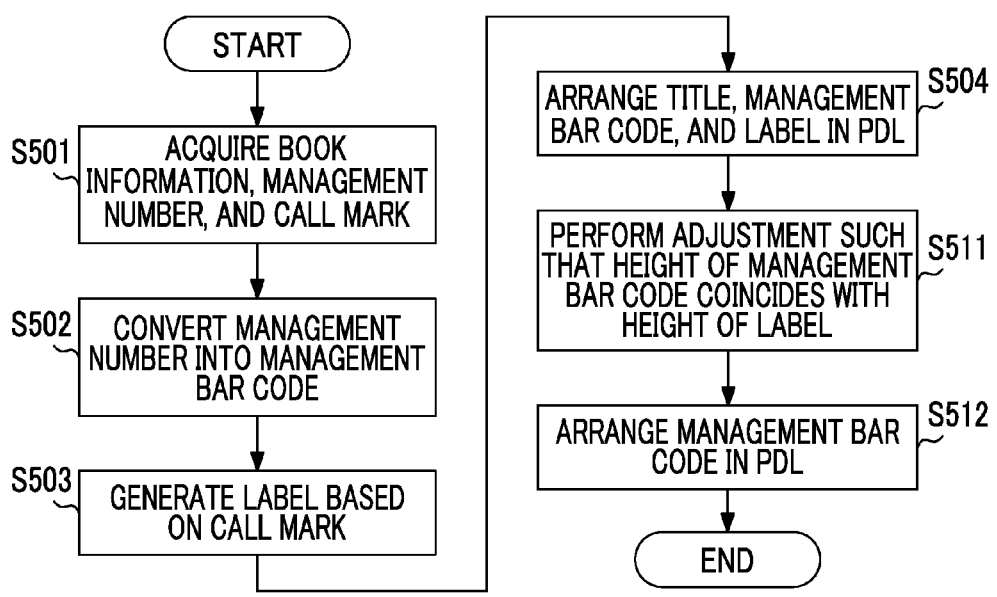
FIG. 20 is a flowchart illustrating the operation of the image processing apparatus.
Figure 29:
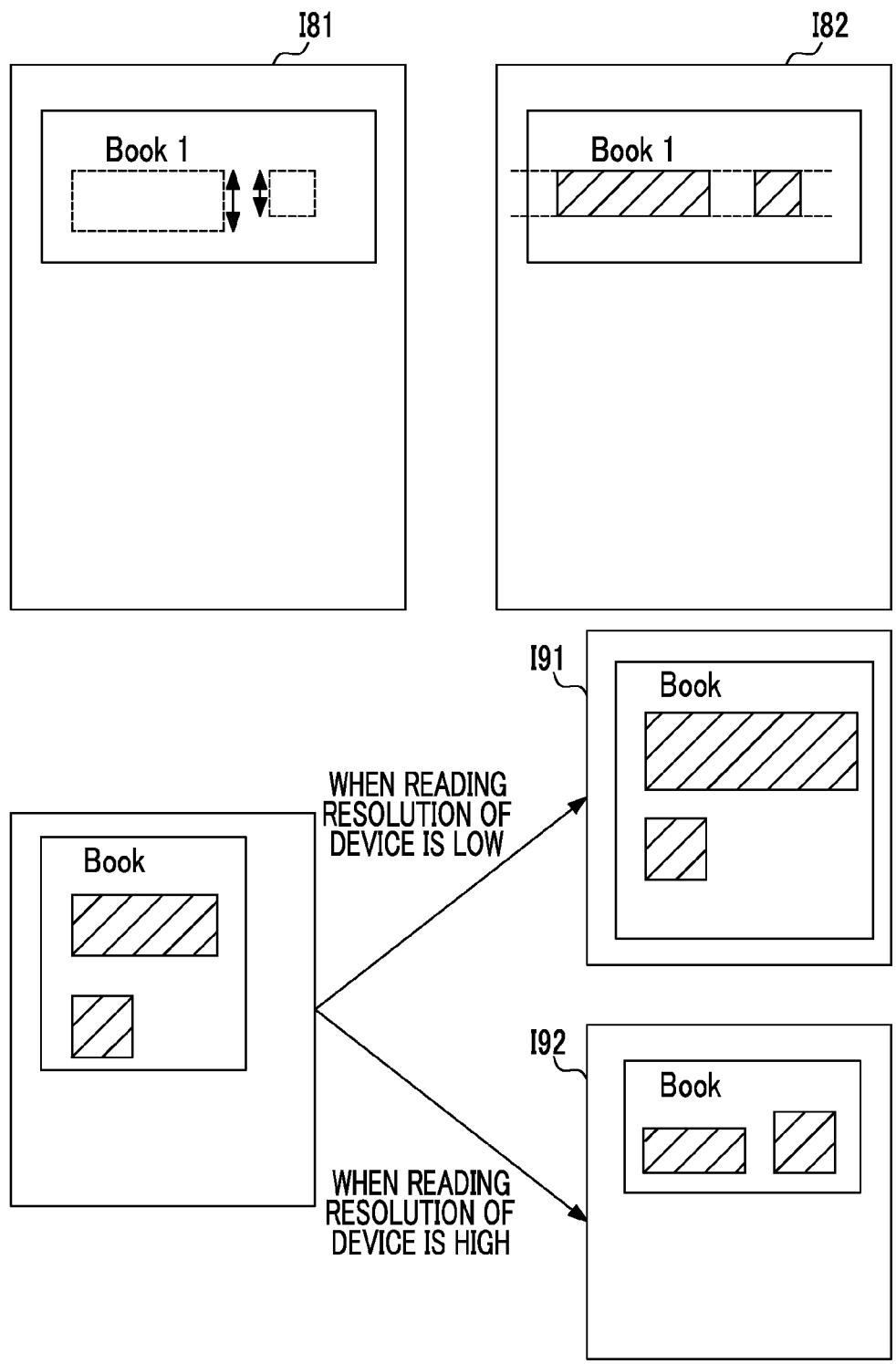
FIG. 29 is a diagram illustrating an example of an image which is formed on the medium by the image processing apparatus.

FIG. 20 is a flowchart illustrating another example of the process to prepare the management bar code 11 and the label 31, which is performed by the image processing apparatus 100. The flowchart shown in FIG. 20 is different from the flowchart shown in FIG. 14 in that processes in steps S511 to S512 are performed after the process in step S504 of FIG. 14 is performed. The control unit 101 arranges the management bar code 11 and the label 31 in a predetermined first direction, and aligns the length of the management bar code 11 and the length of the label 31 in a second direction which is perpendicular to the first direction. In the example, the control unit 101 performs adjustment such that the height of the management bar code 11 coincides with the height of the label 31 in step S511. The control unit 101 arranges the management bar code 11, the height of which is adjusted, in the PDL in step S512. In the operation example, the height of the management bar code 11 and the height of the label 31 are aligned, as shown in an image I82 of FIG. 29.

Eighth Operation Example

Figure 21:
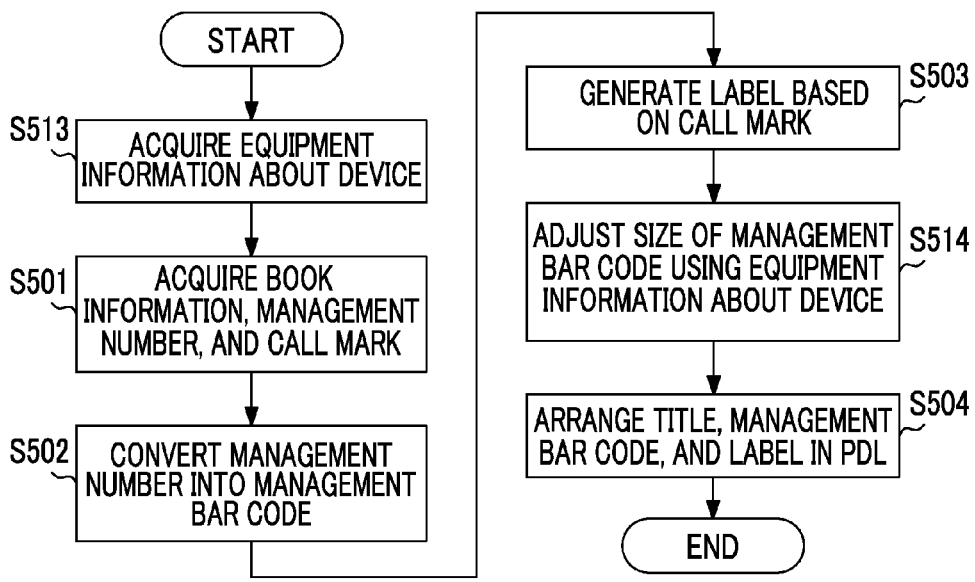
FIG. 21 is a flowchart illustrating the operation of the image processing apparatus.

FIG. 21 is a flowchart illustrating another example of the process to prepare the management bar code 11 and the label 31, which is performed by the image processing apparatus 100. The flowchart shown in FIG. 21 is different from the flowchart shown in FIG. 14 in that a process in step S513 is performed before the process in step S501 of FIG. 14 is performed and that a process in step S514 is performed after the process in step S503 is performed. In FIG. 21, the control unit 101 acquires information relative to performance of at least one of the image forming function and the image reading function of the apparatus. In the example, the control unit 101 acquires equipment information about a device which forms an image of the management bar code 11 on the medium and a device which reads the management bar code 11 in step S513. When the image group is arranged in the PDL, the control unit 101 adjusts the size of the bar code using the equipment information about the device, which is acquired in step S513, in step S514.

For example, when a device, which may form an image by only 100 dpi, is used and a bar code is too small, it is difficult to form an image while accurately distinguishing a thin bar and a thick bar. In this case, the control unit 101 enlarges the size of the management bar code 11 and arranges the enlarged management bar code 11 in the PDL. In addition, when the reading resolution of a device is low, the control unit 101 also enlarges the size of the management bar code 11 and arranges the enlarged management bar code 11 (refer to an image I91 of FIG. 29). In contrast, when the reading device corresponds to 600 dpi and an image forming device may perform output by 600 dpi, a considerably large bar code is not necessary, and thus the size of the management bar code 11 is reduced in order to effectively use the area of the PDL (refer to an image I92 of FIG. 29).

Ninth Operation Example

Figure 22:
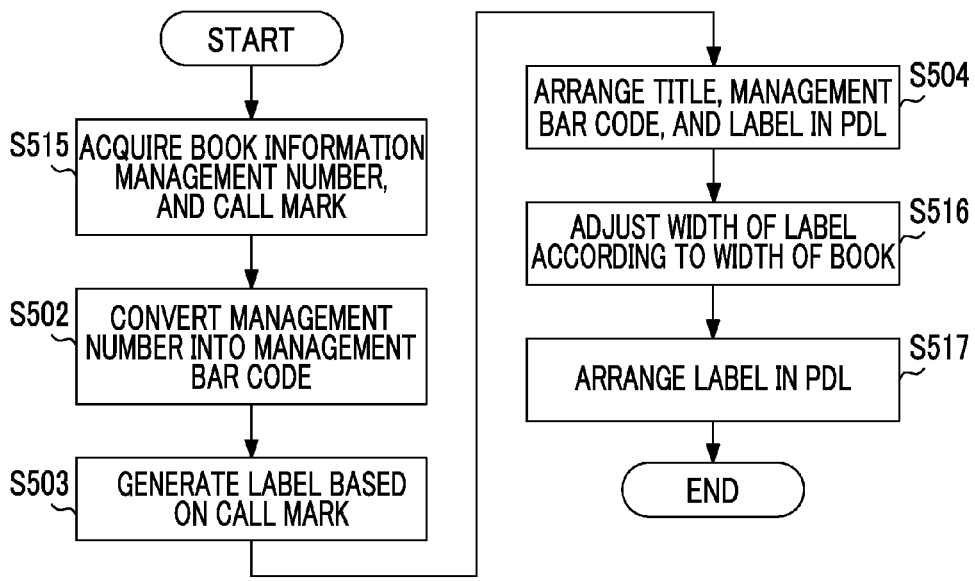
FIG. 22 is a flowchart illustrating the operation of the image processing apparatus.

FIG. 22 is a flowchart illustrating another example of the process to prepare the management bar code 11 and the label 31. The flowchart shown in FIG. 22 is different from the flowchart shown in FIG. 14 in that a process in step S515 is performed instead of the process in step S501 and that processes in steps S516 and S517 are performed after the process in step S504 is performed. The control unit 101 acquires the book information (an example of the attribute information) which includes at least the title of a book and thickness information indicative of the thickness of the book, the management number, the call mark (1), and the call mark (3) from the server apparatus 200 in step S515. In addition, the control unit 101 adjusts the width of the label generated in step S503 according to the thickness information in step S516. Meanwhile, in the operation example, the control unit 101 determines the width of the label according to the thickness information acquired from the server apparatus 200. However, a method of determining the width of the label is not limited thereto. For example, when the information acquired from the server apparatus 200 includes information indicative of the number of pages of the book, the width of the label may be determined based on the information. The control unit 101 arranges the label, the width of which is determined, in the PDL in step S517.

However, a label which is affixed to the spine cover of a book generally has a size of approximately 17 mm×26 mm. However, there is a case in which it is difficult for the operator to affix the label depending on a book as in a case in which the book is slightly thinner than a label. In contrast, in the operation example, a size in which the label is easily affixed is adjusted based on the thickness of the book, and thus the operator easily performs an operation to attach the label. Meanwhile, here, the size in which the label is easily affixed is, for example, a size in which some of the right or the left of the label goes around the cover and the back cover. In contrast, if the label, acquired after the adjustment, is too thin or too thick on the contrary, it is difficult to affix the label. Therefore, in a case of a book having thinness or thickness which exceeds a certain threshold, the control unit 101 does not adjust the original size of the label. In the example, in an image I10 shown in FIG. 30, labels 31a and 31b, the widths of which differ according to the thickness of the book, are prepared.

Tenth Operation Example

Figure 23:
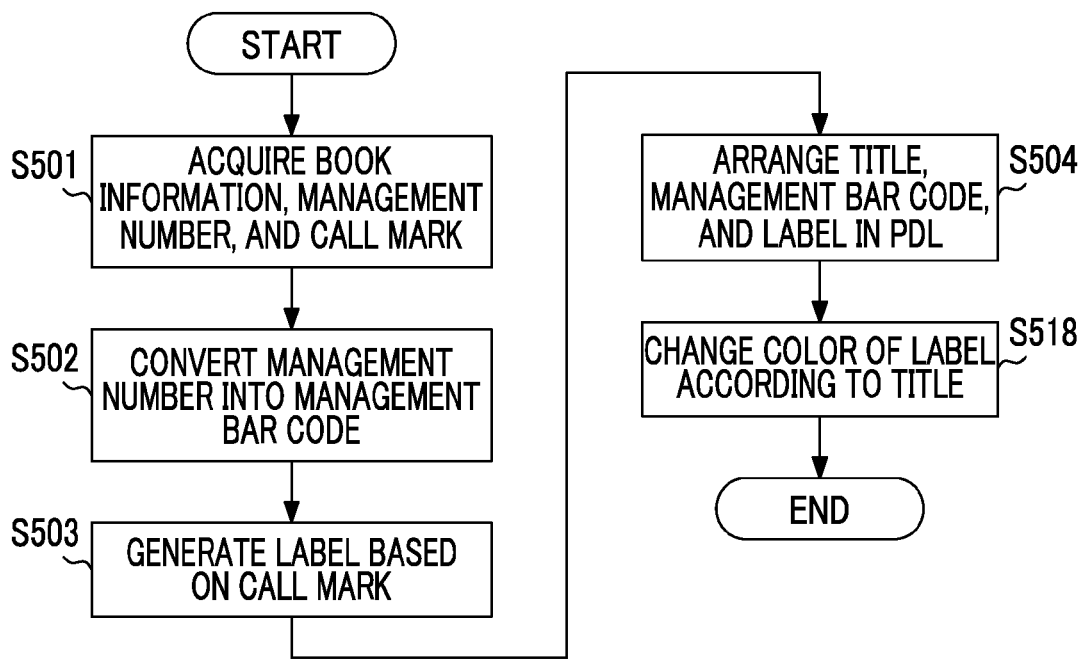
FIG. 23 is a flowchart illustrating the operation of the image processing apparatus.

FIG. 23 is a flowchart illustrating another example of the process to prepare the management bar code 11 and the label 31, which is performed by the image processing apparatus 100. The flowchart shown in FIG. 23 is different from the flowchart shown in FIG. 14 in that a process in step S518 is performed after the process in step S504 of FIG. 14 is performed. In FIG. 23, the control unit 101 determines the color of the label based on the book information acquired from the server apparatus 200 in step S518. For example, the control unit 101 uses a blue label as a default. However, in a case of an in-library use only book, a red label may be used. The color to be used may be set by the operator in advance and may be inquired of the operator every time.

However, although there is a case in which it is desired that the color of the label be changed according to a book (for example, a general book or an in-library use only book), it takes time for the operator to use different colors manually. In contrast, in the exemplary embodiment, a label to be used is selected by the image processing apparatus 100 based on the book information, and thus the manual work of the operator is reduced. In the example, as shown in an image I11 of FIG. 30, labels 31c and 31d of different colors are generated for a general book and an in-library use only.

Eleventh Operation Example

Figure 24:
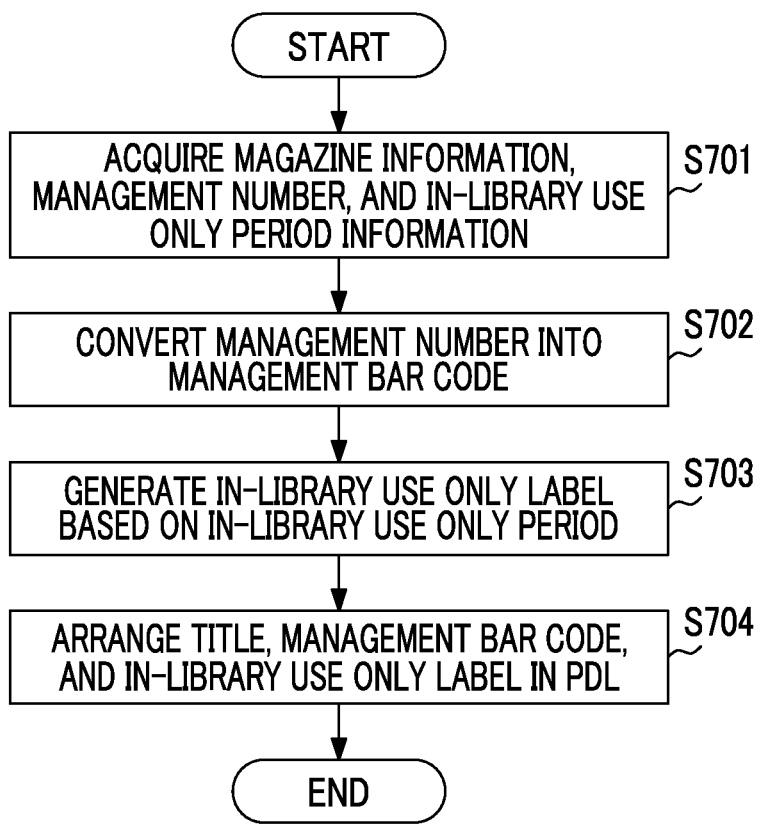
FIG. 24 is a flowchart illustrating the operation of the image processing apparatus.

FIG. 24 is a flowchart illustrating the flow of the process to prepare the management bar code 11 and the in-library use only label 12 (the process in step S313 of FIG. 9) performed by the image processing apparatus 100. The control unit 101 receives a set of the magazine information which includes the title of the magazine, the management number, and the in-library use only period (example of the prohibition period information) from the server apparatus 200 in step S701. The control unit 101 converts the received management number into the management bar code 11 in step S702. The control unit 101 generates the in-library use only label 12 based on the in-library use only period in step S703. The control unit 101 forms the image which expresses the title included in the magazine information, the management bar code 11, and the in-library use only label 12 on one piece of medium in step S704.

Figure 31:
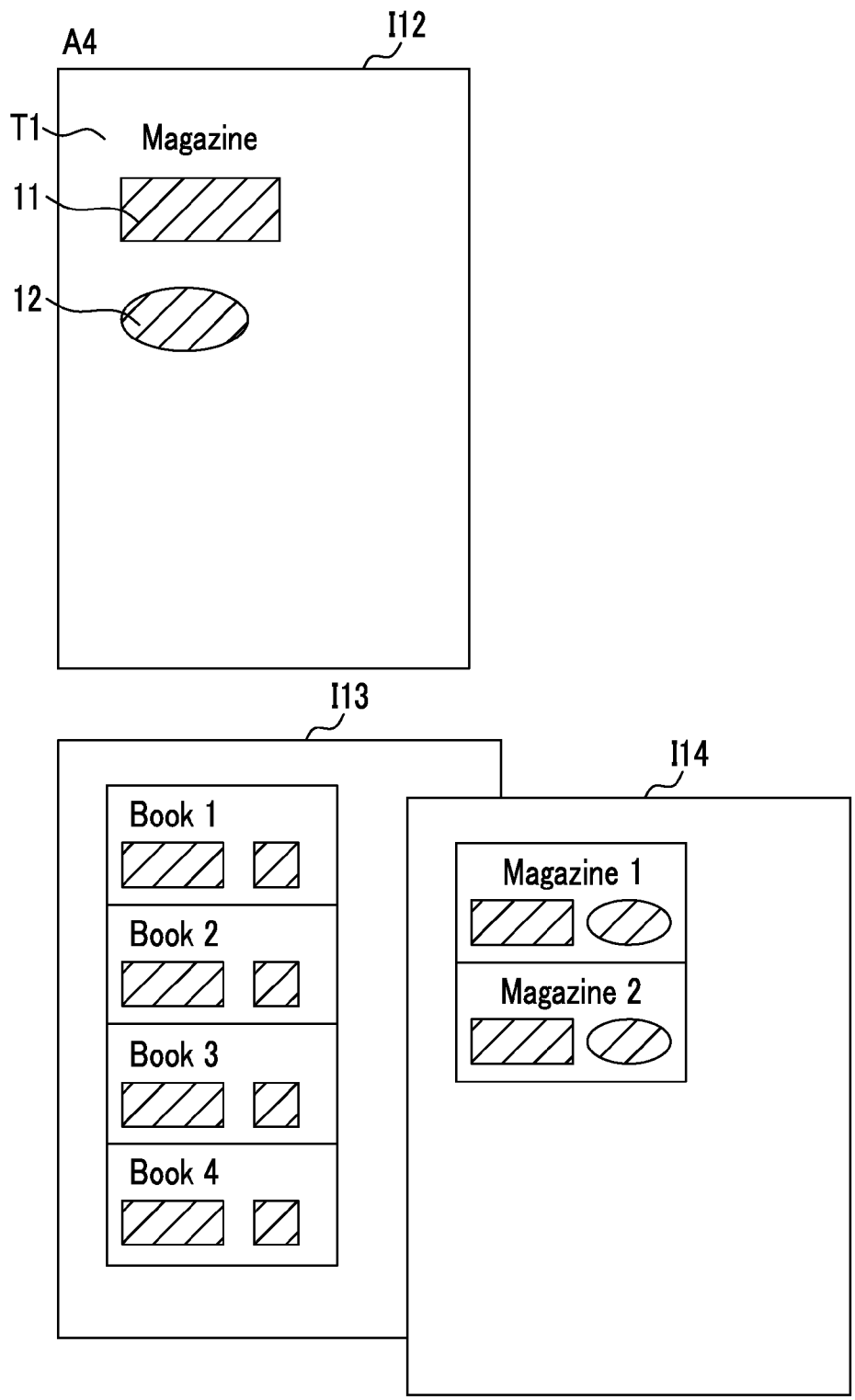
FIG. 31 is a diagram illustrating an example of an image which is formed on the medium by the image processing apparatus.

An image I12 of FIG. 31 is an example of an image which is formed on the medium in step S704. In the example, images of the title T1 of the magazine, the management bar code 11, and the in-library use only label 12 are formed on one piece of medium which has a size of A4.

Twelfth Operation Example

Figure 25:
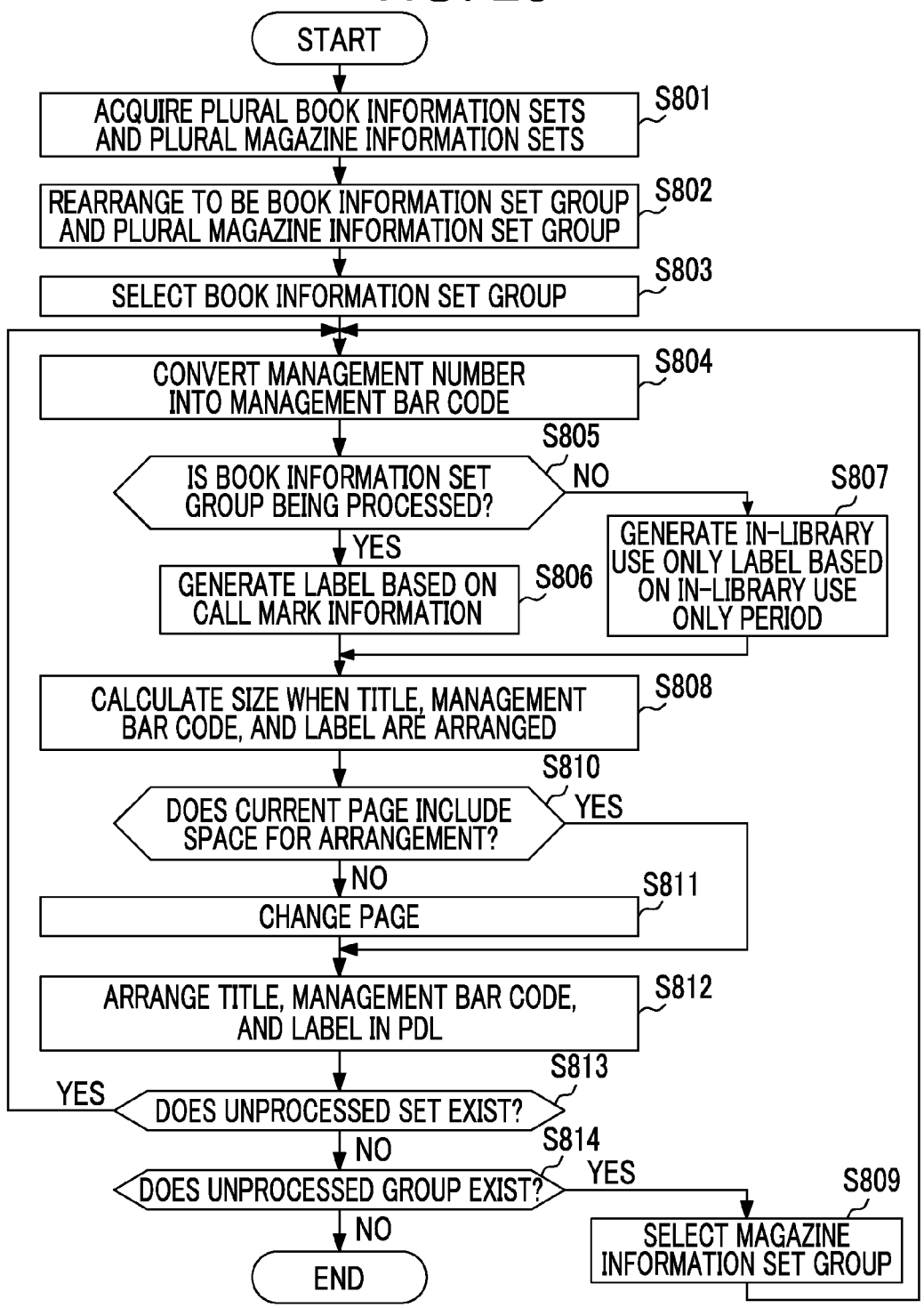
FIG. 25 is a flowchart illustrating the operation of the image processing apparatus.

FIG. 25 is a flowchart illustrating the flow of a process to generate the management bar code 11, the label 31, and the in-library use only label 12 performed by the image processing apparatus 100. In the example, an operation to collectively process plural sets (hereinafter, referred to as "book information sets") of the book information which includes the title of the book, the management number, the call mark (1), and the call mark (3) and plural sets (hereinafter, referred to as "magazine information sets") of the magazine information which includes the title of the magazine, the management number, and the in-library use only period will be described. The control unit 101 receives the plural book information sets and the plural magazine information sets from the server apparatus 200 in step S801. The control unit 101 rearranges the received plural book information sets and the plural magazine information sets such that the received plural book information sets and the plural magazine information sets become a book information set group and a magazine information set group in step S802. For example, when the sets are received in the order of "book 1", "book 2", "magazine 1", "magazine 2", and "book 3", the control unit 101 may perform rearrangement in order of "book 1", "book 2", "book 3", "magazine 1", and "magazine 2".

The control unit 101 selects one book information set from among the rearranged book information set groups in step S803. For example, the control unit 101 may select the book information sets one by one in ascending order. The control unit 101 converts the management number, which is included in the selected book information set, into the management bar code in step S804. In addition, the control unit 101 generates the label based on the call mark (1) and the call mark (3), which are included in the selected book information set, in step S806. Meanwhile, when the set which is being processed is not the book information set but the magazine information set in step S805 (NO), the control unit 101 generates the in-library use only label based on the in-library use only period in step S807.

Subsequently, the control unit 101 calculates the size when an image group corresponding to a set which is being processed is arranged in the PDL in step S808. Meanwhile, here, the size includes vertical and horizontal sizes of the rectangular frame which includes the image group. The control unit 101 determines whether or not there is a space to arrange the calculated size in the PDL in step S810. When there is no space corresponding to the calculated size in step S810 (NO), the control unit 101 changes the page for the PDL in step S811. When there is the space which may arrange the image group having the calculated size in step S810 (YES) and when the page is changed, the control unit 101 arranges the image group in the space in step S812.

When book information sets which are not completely processed are present, the control unit 101 selects one of the remaining book information sets, returns to the process in step S804, and repeats the processes subsequent to the process to generate the management bar code 11. In addition, when the process performed on the book information set group is ended in step S814 (YES), the control unit 101 starts a process for the magazine information sets in step S809.

However, when the plural book information sets and the plural magazine information sets are collectively processed, the operator easily performs an operation if the image group, such as the management bar code 11, is output after sorting books and magazines. In contrast, if inputs are performed on the image processing apparatus 100 by separating books and magazines in advance, it takes time. In contrast, in the exemplary embodiment, the image processing apparatus 100 collectively arranges image groups for the books and the magazines, and thus the operator easily performs an operation. In the example, as shown in images I13 and I14 of FIG. 31, the book image group and the magazine image group are formed respectively on the medium.

Lending

Subsequently, the process in step S107 (FIG. 8) performed when the publication is lent will be described with reference to FIG. 10.

The control unit 210 of the server apparatus 200 decodes one or more bar codes included in the scan image data and acquires one or more pieces of information. The control unit 210 determines whether or not the pieces of information include a letter string indicative of the user ID in step S200. When the user ID is acquired in step S200 (Yes), the control unit 210 compares the acquired user ID with the user ID which is included in the user DB stored in the storage unit 220, and determines whether or not the user is a valid user in step S201. When the user is the valid user in step S201 (Yes), the control unit 210 determines whether or not the pieces of information include a letter string indicative of the management number in step S202. When the management number is acquired in step S202 (Yes), the control unit 210 determines whether or not the publication is a book with reference to the management number in step S203. In a case of a book in step S203 (Yes), the control unit 210 reads the book DB 221 in step S204, and updates a lending flag, a user ID, and a lending date for the management number on lending content in step S205.

In contrast, when the control unit 210 determines that the publication is a magazine with reference to the management number in step S203 (No) and in step S206 (Yes), the control unit 210 reads the magazine DB 222 in step S207. When the in-library use only period elapses in step S208 (Yes), the control unit 210 updates the lending flag, the user ID, and the lending date for the management number on lending content on non-lending content in step S209. Meanwhile, when it is not possible to acquire the user ID and the management number in step S201 (No) or in step S202 (No), or when the in-library use only period does not elapse in step 208 (No), the control unit 210 determines that the publication is not to be lent, and instructs the image processing apparatus 100 to perform error display in step S210. That is, the determination performed in steps S201, S202, and S208 corresponds to determination of whether or not it is possible to perform publication lending which is the requested process.

With regard to the returning of a book or a magazine, the lending flag, the user ID, and the lending date for the management number may be updated on returning content in the same procedures performed when lending is performed.

In addition, when the publication is removed from the database, the control unit 210 of the server apparatus 200 decodes one or more bar codes included in the scan image data, and acquires one or more pieces of information. The control unit 210 determines whether or not the pieces of information include the letter string indicative of the management number. When the management number is acquired, the control unit 210 removes information corresponding to the management number from the book DB 221 in a case of a book with reference to the management number, and removes information corresponding to the management number from the magazine DB 222 in a case of a magazine with reference to the management number.

Meanwhile, in the example of FIG. 10, certification is performed based on the user ID after the user selects a desired process (lending or returning). However, a procedure in which the user is first certified and then the desired process is selected may be performed. In addition, although the certification is performed using the medium called the user card, this is only an example. The certification may be performed in such a way that the user manually inputs the user ID and the password, and any method may be used, if it is possible to determine whether or not the user is a valid user, such as certification using body information such as the face of the user. In addition, certification of a normal image processing apparatus as a multi-function machine may be in common with certification of book management, such as "lend the publication" and "return the publication".

Meanwhile, the subject of processes in the above-described flows of FIGS. 8 to 10 is not limited to the examples in the above-described exemplary embodiment. For example, the processes in steps S103 and S104 may be performed by the image processing apparatus 100 instead of the server apparatus 200.

In addition, in the above-described exemplary embodiment, the first to twelfth operation examples are shown as the operations to generate the management bar code and the label, but the operations may be performed in such a way that plural operations are combined.

Meanwhile, the certification of the user may be realized using an IC card or a method of living body certification or the like.

The present invention may be provided in a form of a program causing a computer to function as the information processing apparatus, or a recording medium which records the program. In addition, the program according to the exemplary embodiments of the present invention may be downloaded to the computer through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   at least one processor configured to execute:
      an acquisition section configured to acquire one or more sets of attribute information, the attribute information including an attribute of a publication, identification information which identifies the publication, and label information which indicates at least one of an arrangement of the publication in an establishment and a period during which the publication is not permitted to be lent;
      a conversion section configured to convert the acquired identification information into a code image;
      a generation section configured to that generate a label image based on the acquired label information; and
      an image generating section configured to generate an image which expresses one or more of the acquired attribute information, the code image, and the generated label image on one or more media such that image groups corresponding to one set are generated to be formed on one piece of medium,
   wherein, the acquisition section is configured to, in response to the publication being a book, acquire arrangement information, which indicates arrangement of the book in the establishment, as the label information,
   wherein the acquisition section is configured to, in response to the publication being a magazine, acquire prohibition period information, which indicates a period during which the magazine is not permitted to be lent, as the label information, and
   wherein the image generating section is configured to sort the image groups according to whether the publication is the book or the magazine, and arrange the image groups in the sorted order.

2. The image processing apparatus according to claim 1, wherein the image generating section is configured to generate a first frame image which surrounds the code image and a second frame image which surrounds the label image, on the one or more media in addition to the image which expresses the attribute information, the code image, and the label image.

3. The image processing apparatus according to claim 1, wherein the image generating section is configured to generate a third frame image which surrounds the image which expresses the attribute information, the code image, and the label image, to be formed on the one or more media.

4. The image processing apparatus according to claim 2, wherein the image generating section is configured to generate a third frame image which surrounds the image which expresses the attribute information, the code image, and the label image, to be formed on the one or more media.

5. The image processing apparatus according to claim 1, wherein the acquisition section is configured to acquire a plurality of sets of attribute information, and
   wherein the image generating section is configured to arrange the plurality of image groups sequentially on a page which has a predetermined size, and change a page in which the image groups are arranged when the page does not include a space in which image groups are arranged.

6. The image processing apparatus according to claim 2, wherein the acquisition section is configured to acquire a plurality of sets of attribute information, and
   wherein the image generating section is configured to arrange the plurality of image groups sequentially on a page which has a predetermined size, and change a page in which the image groups are arranged when the page does not include a space in which image groups are arranged.

7. The image processing apparatus according to claim 3, wherein the acquisition section is configured to acquire a plurality of sets of attribute information, and
   wherein the image generating section is configured to arrange the plurality of image groups sequentially on a page which has a predetermined size, and change a page in which the image groups are arranged when the page does not include a space in which image groups are arranged.

8. The image processing apparatus according to claim 4, wherein the acquisition section is configured to acquire a plurality of sets of attribute information, and
   wherein the image generating section is configured to arrange the plurality of image groups sequentially on a page which has a predetermined size, and change a page in which the image groups are arranged when the page does not include a space in which image groups are arranged.

9. The image processing apparatus according to claim 1, wherein the acquisition section is configured to acquire a plurality of sets of attribute information, and
   wherein the image generating section is configured to sort the plurality of the image groups based on at least one of the attribute information, the identification information, and the label information, and arrange the plurality of the image groups on one or more pieces of pages in the sorted order.

10. The image processing apparatus according to claim 2, wherein the acquisition section is configured to acquire a plurality of sets of attribute information, and
    wherein the image generating section is configured to sort the plurality of the image groups based on at least one of the attribute information, the identification information, and the label information, and arrange the plurality of the image groups on one or more pieces of pages in the sorted order.

11. The image processing apparatus according to claim 3, wherein the acquisition section is configured to acquire a plurality of sets of attribute information, and
wherein the image generating section is configured to sort the plurality of the image groups based on at least one of the attribute information, the identification information, and the label information, and arrange the plurality of the image groups on one or more pieces of pages in the sorted order.

12. The image processing apparatus according to claim 4, wherein the acquisition section is configured to acquire a plurality of sets of attribute information, and
wherein the image generating section sorts the plurality of the image groups based on at least one of the attribute information, the identification information, and the label information, and arrange the plurality of the image groups on one or more pieces of pages in the sorted order.

13. The image processing apparatus according to claim 1, wherein the at least one processor is further configured to execute:
a calculation section configured to calculate a size of an area, in which the image groups are generated to be formed, of the medium; and
a selection section configured to select a medium, in which a relationship with the calculated size satisfies a predetermined condition, among the plurality of media which have respectively different sizes.

14. The image processing apparatus according to claim 1, wherein the image generating section is configured to arrange the code image and the label image in a predetermined first direction, and align a length of the code image and a length of the label image in a second direction perpendicular to the first direction.

15. The image processing apparatus according to claim 1, wherein the at least one processor is further configured to execute:
an information acquisition section configured to acquire information relative to performance of at least one of an image generating function and an image reading function of the apparatus; and
wherein the image generating section is configured to determine a size of the code image based on the acquired information.

16. The image processing apparatus according to claim 1, wherein the attribute information includes thickness information which indicates a thickness of the publication, and
wherein the image generating section is configured to determine a size of the label image in a predetermined direction such that a relationship between the size of the label image in the predetermined direction and the thickness satisfies the predetermined condition.

17. The image processing apparatus according to claim 1, wherein the image generating section is configured to determine a color of the label image based on the acquired attribute information.

18. The image processing apparatus according to claim 1, wherein the publication comprises a book.

19. The image processing apparatus according to claim 1, wherein the identification information comprises an international standard book number (ISBN).

20. A system comprising:
an image processing apparatus comprising:
at least a first processor configured to execute:
an acquisition section configured to acquire one or more sets of attribute information, the attribute information including an attribute of a publication, identification information which identifies the publication, and label information which indicates an arrangement of the publication in an establishment;
a conversion section configured to convert the acquired identification information into a code image:
a generation section configured to that generate a label image based on the acquired label information; and
an image generating section configured to generate an image which expresses one or more of the acquired attribute information, the code image, and the generated label image on one or more media such that image groups corresponding to one set are generated to be formed on one piece of medium; and
an information processing apparatus that is connected to the image processing apparatus,
wherein the information processing apparatus includes:
at least a second processor configured to execute:
a second acquisition section configured to acquire a code read from the publication;
a third acquisition section configured to acquire the set of the attribute information, the identification information, and the label information specified by the acquired code; and
a transmission section configured to transmit a set of the acquired attribute information, identification information, and label information to the image processing apparatus.

21. A non-transitory computer readable medium storing a program causing a computer to execute a process, the process comprising:
acquiring one or more sets of attribute information, the attribute information including an attribute of a publication, identification information which identifies the publication, and label information which indicates at least one of an arrangement of the publication in an establishment and a period during which the publication is not permitted to be lent;
converting the acquired identification information into a code image;
generating a label image based on the acquired label information; and
generating an image which expresses one or more of the acquired attribute information, the code image which is acquired through conversion, and the generated label image on one or more media such that image groups corresponding to one set are generated to be formed on one piece of medium,
wherein the acquiring comprises, in response to the publication being a book, acquiring arrangement information, which indicates arrangement of the book in the establishment, as the label information,
wherein the acquiring comprises, in response to the publication being a magazine, acquiring prohibition period information, which indicates a period during which the magazine is not permitted to be lent, as the label information, and
wherein the process further comprises:
sorting the image groups according to whether the publication is the book or the magazine; and arranging the image groups in the sorted order.

* * * * *